(12) United States Patent
Chang et al.

(10) Patent No.: US 10,470,517 B2
(45) Date of Patent: Nov. 12, 2019

(54) METHOD OF MAKING MOISTURE-PERMEABLE WATERPROOF SHOE

(71) Applicants: Chung-Hao Chang, Taichung (TW); Chia-Ying Chang, Taichung (TW)

(72) Inventors: Chung-Hao Chang, Taichung (TW); Chia-Ying Chang, Taichung (TW)

(*) Notice: Subject to any disclaimer, the term of this patent is extended or adjusted under 35 U.S.C. 154(b) by 106 days.

(21) Appl. No.: 15/948,167

(22) Filed: Apr. 9, 2018

(65) Prior Publication Data

US 2019/0223545 A1    Jul. 25, 2019

(30) Foreign Application Priority Data

Jan. 23, 2018 (TW) ............................ 107102383 A

(51) Int. Cl.
| | | |
|---|---|---|
| *A43B 7/00* | (2006.01) | |
| *A43B 7/12* | (2006.01) | |
| *A43B 23/07* | (2006.01) | |
| *A43B 23/06* | (2006.01) | |
| *A43B 23/02* | (2006.01) | |
| *B32B 5/24* | (2006.01) | |
| *B32B 7/12* | (2006.01) | |
| *A43B 1/14* | (2006.01) | |
| *A43B 13/32* | (2006.01) | |
| *B32B 27/12* | (2006.01) | |

(52) U.S. Cl.
CPC ............... *A43B 7/125* (2013.01); *A43B 1/14* (2013.01); *A43B 13/32* (2013.01); *A43B 23/022* (2013.01); *A43B 23/026* (2013.01); *A43B 23/0235* (2013.01); *A43B 23/0255* (2013.01); *B32B 5/245* (2013.01); *B32B 7/12* (2013.01); *B32B 27/12* (2013.01); *B32B 2307/7265* (2013.01); *B32B 2437/02* (2013.01)

(58) Field of Classification Search
CPC . A43B 23/022; A43B 23/0235; A43B 23/026; A43B 7/125
See application file for complete search history.

(56) References Cited

U.S. PATENT DOCUMENTS

| | | | | |
|---|---|---|---|---|
| 5,738,937 A | * | 4/1998 | Baychar | A43B 5/0405 428/316.6 |
| 6,035,555 A | * | 3/2000 | Pavelescu | A43B 7/125 36/12 |
| 6,446,360 B1 | * | 9/2002 | Sheets | A43B 23/022 36/55 |
| 6,817,112 B2 | * | 11/2004 | Berger | A43B 7/08 36/103 |

(Continued)

*Primary Examiner* — Jila M Mohandesi
(74) *Attorney, Agent, or Firm* — Hamre, Schumann, Mueller & Larson, P.C.

(57) ABSTRACT

A method of making a moisture-permeable waterproof shoe includes: cutting a substrate to form a cut piece having a main body and two wing portions; ultrasonically welding rear mating edges of the main body, wing lateral edges of the wing portions, front and rear curved edges of each wing portion respectively to a front convex portion and a lateral connecting edge of the main body to form a shoe-like inner sleeve: sleeving the inner sleeve on a shoe last; coating an adhesive on an inner surface of an upper; sleeving the upper on the shoe last and heating the assembly to form a moisture-permeable waterproof foot cover; and fixing a bottom portion of the moisture-permeable waterproof foot cover to a sole.

11 Claims, 22 Drawing Sheets

(56) References Cited

U.S. PATENT DOCUMENTS

| | | | | |
|---|---|---|---|---|
| 6,935,053 B2* | 8/2005 | Wiener | ............... | A43B 7/125 |
| | | | | 36/14 |
| 6,978,557 B2* | 12/2005 | Lee | ............... | A43B 7/12 |
| | | | | 12/142 F |
| 7,055,267 B2* | 6/2006 | Wilson | ............... | A43B 7/08 |
| | | | | 36/10 |
| 7,543,398 B2* | 6/2009 | Hsaio | ............... | A43B 7/125 |
| | | | | 36/14 |
| 8,569,190 B2* | 10/2013 | Baychar | ............... | A43B 1/0045 |
| | | | | 428/304.4 |
| 9,943,135 B2* | 4/2018 | Baychar | ............... | B32B 3/26 |
| 2016/0309835 A1* | 10/2016 | Maccioni | ............... | A43B 7/12 |

* cited by examiner

METHOD OF MAKING MOISTURE-PERMEABLE WATERPROOF SHOE

CROSS-REFERENCE TO RELATED APPLICATION

This application claims priority to Taiwanese Patent Application No. 107102383, filed on Jan. 23, 2018.

FIELD

The disclosure relates to a shoe, more particularly to a method of making a moisture-permeable waterproof shoe.

BACKGROUND

Current shoe industry is a mature and developed industry. There are many kinds of shoe products, for example, casual shoes, sports shoes, long and short boots, rain boots, etc. Although the casual shoes, the sports shoes, and the long and short boots having uppers made of fabric, textile or natural leather can effectively discharge sweat from the user's feet, they cannot prevent penetration of water into an interior of the shoes. Further, although the casual shoes, the sports shoes, and the long and short boots having the uppers made of plastic leather can prevent penetration of water into the interior of the shoes, they cannot effectively discharge sweat from the user's feet, thereby causing the user's feet to feel hot and uncomfortable.

Rain boots, on the other hand, are injection molded from rubber. Although they have a waterproof function, they are stiff and heavy when worn, so that when the rain boots are worn for walking, they can cause a great burden and bending resistance on the user's feet, leading to discomfort. Moreover, the rubber rain boots cannot discharge sweat, thereby also causing the user's feet to feel hot and uncomfortable.

Shoes having moisture permeable and waterproof functions are also being developed nowadays, but the uppers of these shoes are made by sewing together several upper pieces. The sewing threads will rub against the user's feet, so that there is discomfort and presence of foreign body felt by the user's feet.

SUMMARY

Therefore, an object of the present disclosure is to provide a method of making a moisture-permeable waterproof shoe that is capable of alleviating at least one of the drawbacks of the prior art.

Accordingly, a method of making a moisture-permeable waterproof shoe of this disclosure includes:

(A) preparing an upper, a substrate, a waterproof unit, a sole, and a shoe last, the upper defining a receiving space having a top open end, the substrate including a lining layer, a foam layer disposed on an outer surface of the lining layer, a first adhesive layer between the lining layer and the foam layer, an outer fabric layer disposed on an outer surface of the foam layer, a second adhesive layer between the outer fabric layer and the foam layer, a moisture-permeable waterproof membrane disposed on an outer surface of the outer fabric layer, and a third adhesive layer between the outer fabric layer and the moisture-permeable waterproof membrane;

(B) cutting the substrate to form a cut piece, the cut piece having a main body, and two wing portions symmetrically disposed on two opposite sides of the main body and integrally connected as one piece with the main body, the main body having a front convex portion, and a rear concave portion opposite to the front convex portion, the rear concave portion having an inwardly curved edge, two symmetrical rear mating edges extending outwardly and oppositely from two opposite ends of the inwardly curved edge, and two symmetrical lateral connecting edges each of which extends inwardly and transversely from one end of a respective one of the rear mating edges that is opposite to the inwardly curved edge, each of the wing portions including a wing lateral edge spaced apart from the main body and having a front end and a rear end, a front curved edge between the front end of the wing lateral edge and the front convex portion, and a rear curved edge between the rear end of the wing lateral edge and a respective one of the lateral connecting edges;

(C) ultrasonically welding the rear mating edges of the rear concave portion to each other, ultrasonically welding the wing lateral edges to each other, ultrasonically welding the front curved edge of each of the wing portions to a periphery of the front convex portion of the main body, and ultrasonically welding the rear curved edge of each of the wing portions to the respective one of the lateral connecting edges of the rear concave portion so as to form the cut piece into a shoe-like inner sleeve, the shoe-like inner sleeve defining a wearing space that has a top open end and a closed bottom end, the top open end of the wearing space being defined by the inwardly concave edge of the rear concave portion after the rear mating edges are welded to each other:

(D) fixing the waterproof unit to an outer surface of the shoe-like inner sleeve so as to cover a junction of the rear mating edges of the rear concave portion, a junction of the wing lateral edges, a junction of the front curved edge of each of the wing portions and the periphery of the front convex portion of the main body, and a junction of the rear curved edge of each of the wing portions and the respective one of the lateral connecting edges of the rear concave portion;

(E) sleeving the shoe-like inner sleeve on the shoe last such that the shoe last is inserted into the wearing space of the shoe-like inner sleeve, and coating an adhesive on the outer surface of the shoe-like inner sleeve and then drying the same;

(F) coating an adhesive on an inner surface of the upper and then drying the same;

(G) sleeving the upper on the shoe last with the shoe-like inner sleeve such that the shoe last along with the shoe-like inner sleeve is inserted into the receiving space of the upper, and heating the assembly of the shoe last, the shoe-like inner sleeve and the upper to a predetermined temperature so as to adhere the shoe-like inner sleeve and the upper together and form a moisture-permeable waterproof foot cover; and (H) fixing a bottom portion of the moisture-permeable waterproof foot cover to the sole.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
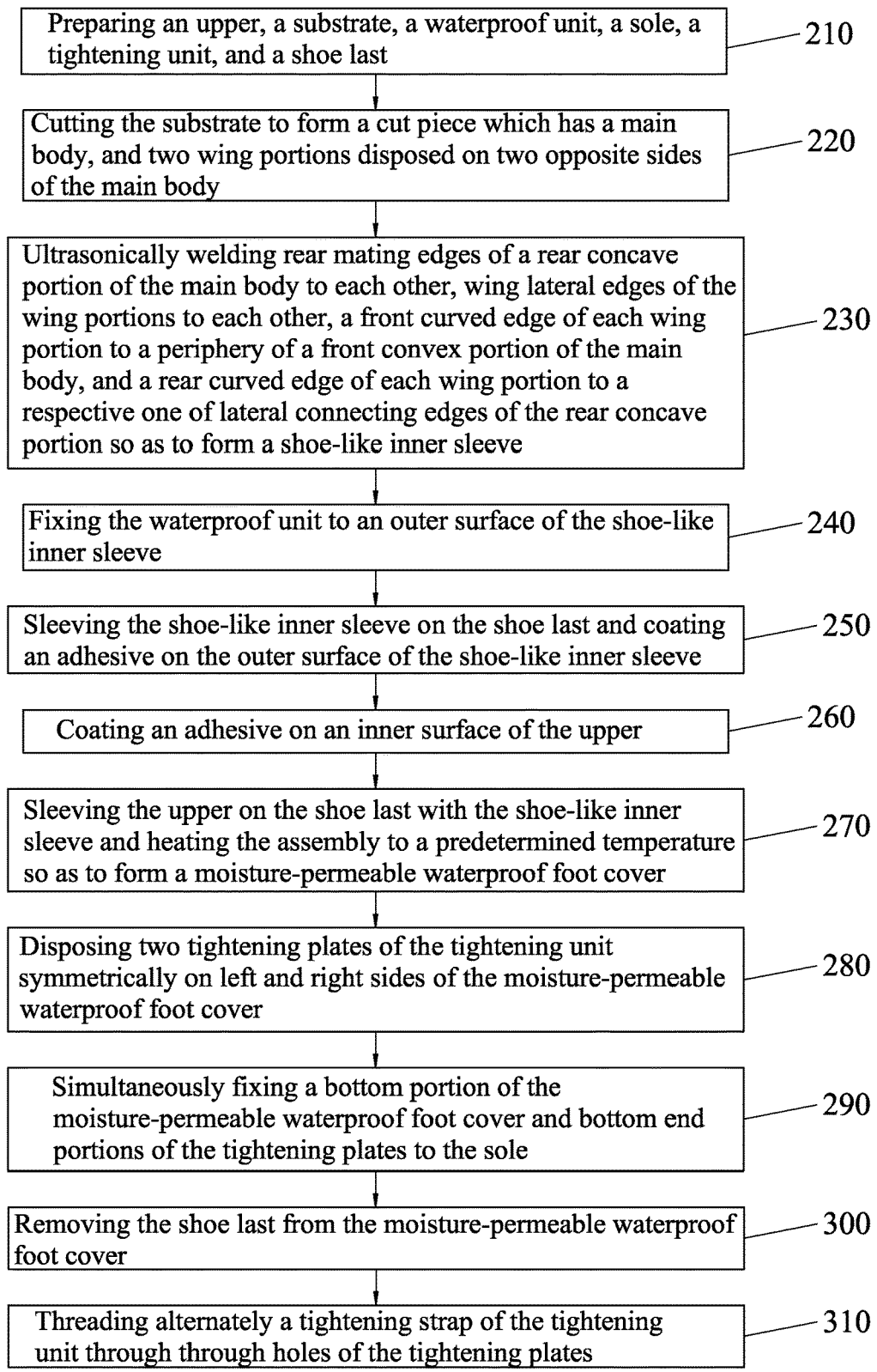
FIG. 1 is a flow chart, illustrating the steps involved in a method of making a moisture-permeable waterproof shoe according to the embodiment of this disclosure.

Referring to FIG. 1, a method of making a moisture-permeable waterproof shoe 100 according to the embodiment of the present disclosure is shown to include steps 210 to 310. The steps of the method of the embodiment will be described in combination with FIGS. 2 to 19.

Figure 2:
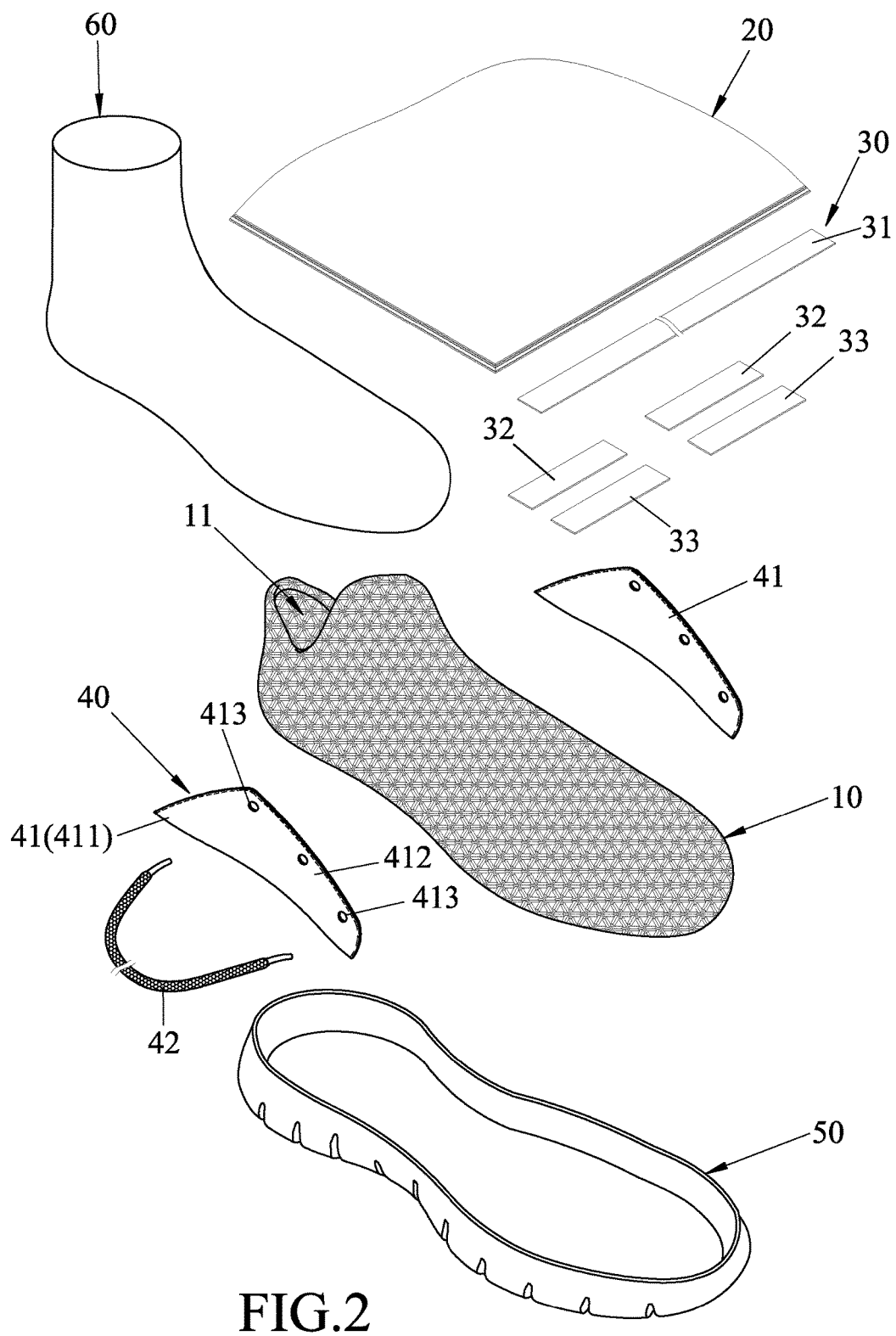
FIG. 2 is a perspective view of an upper, a substrate, a waterproof unit, a sole, a tightening unit, and a shoe last of the embodiment.
Figure 3:
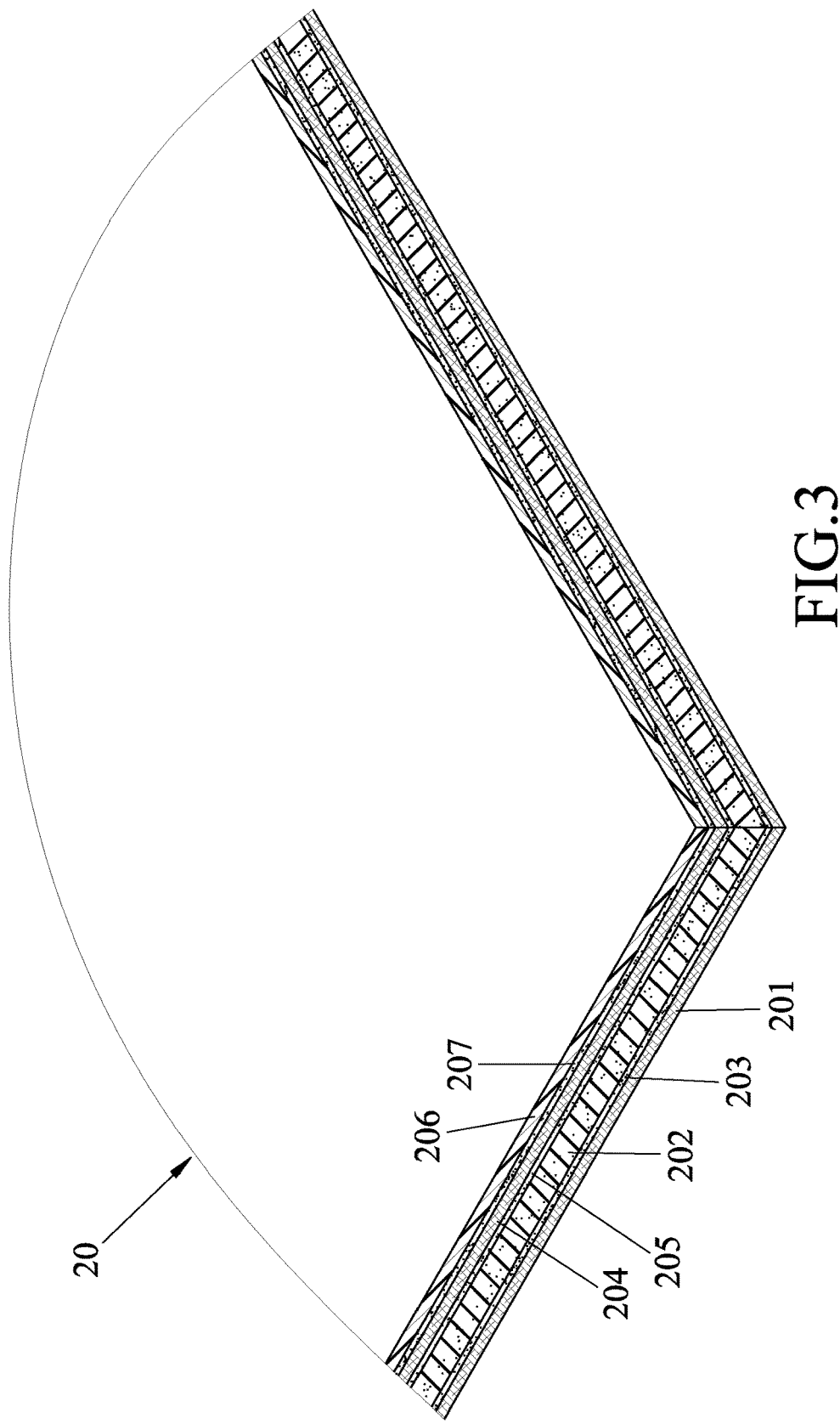
FIG. 3 is an enlarged fragmentary sectional view of the substrate.

In step 210, with reference to FIG. 2, an upper 10, a substrate 20, a waterproof unit 30, a tightening unit 40, a sole 50 and a shoe last 60 are prepared. The upper 10 defines a receiving space 11 having a top open end. In this embodiment, the upper 10 has a sock shape, but is not limited thereto. The substrate 20, as shown in FIG. 3, includes a lining layer 201, a foam layer 202 disposed on an outer surface of the lining layer 201, a first adhesive layer 203 between the lining layer 201 and the foam layer 202, an outer fabric layer 204 disposed on an outer surface of the foam layer 202, a second adhesive layer 205 between the outer fabric layer 204 and the foam layer 202, a moisture-permeable waterproof membrane 206 disposed on an outer surface of the outer fabric layer 204, and a third adhesive layer 207 between the outer fabric layer 204 and the moisture-permeable waterproof membrane 206.

In this embodiment, the moisture-permeable waterproof membrane 206 is made of polyurethane (PU). In other embodiment, the moisture-permeable waterproof membrane 206 may be made of thermoplastic polyurethane (TPU), polyethylene (PE), polytetrafluoroethylene (PTFE), polypropylene (PP), or thermoplastic polyester elastomer (TPEE). Further, the moisture-permeable waterproof membrane 206 has a water pressure resistance of not less than 3000 mm $H_2O$ using the standard test method of the Japanese regulation JIS L1092B, and a moisture permeability of not less than 3000 $g/m^2/24$ hr using the standard test method of the Japanese regulation JIS L1099B1. Hence, the moisture-permeable waterproof membrane 206 has waterproof and moisture-permeable effects.

The waterproof unit 30 includes a main waterproof strip 31, two first auxiliary waterproof strips 32 and two second auxiliary waterproof strips 33. The tightening unit 40 includes two decorative tightening plates 41 and a tightening strap 42. Each tightening plate 41 has a bottom end portion 411, and a top end portion 412 formed with a plurality of spaced-apart through holes 413. In this embodiment, the tightening strap 42 is a shoe lace.

Figure 4:
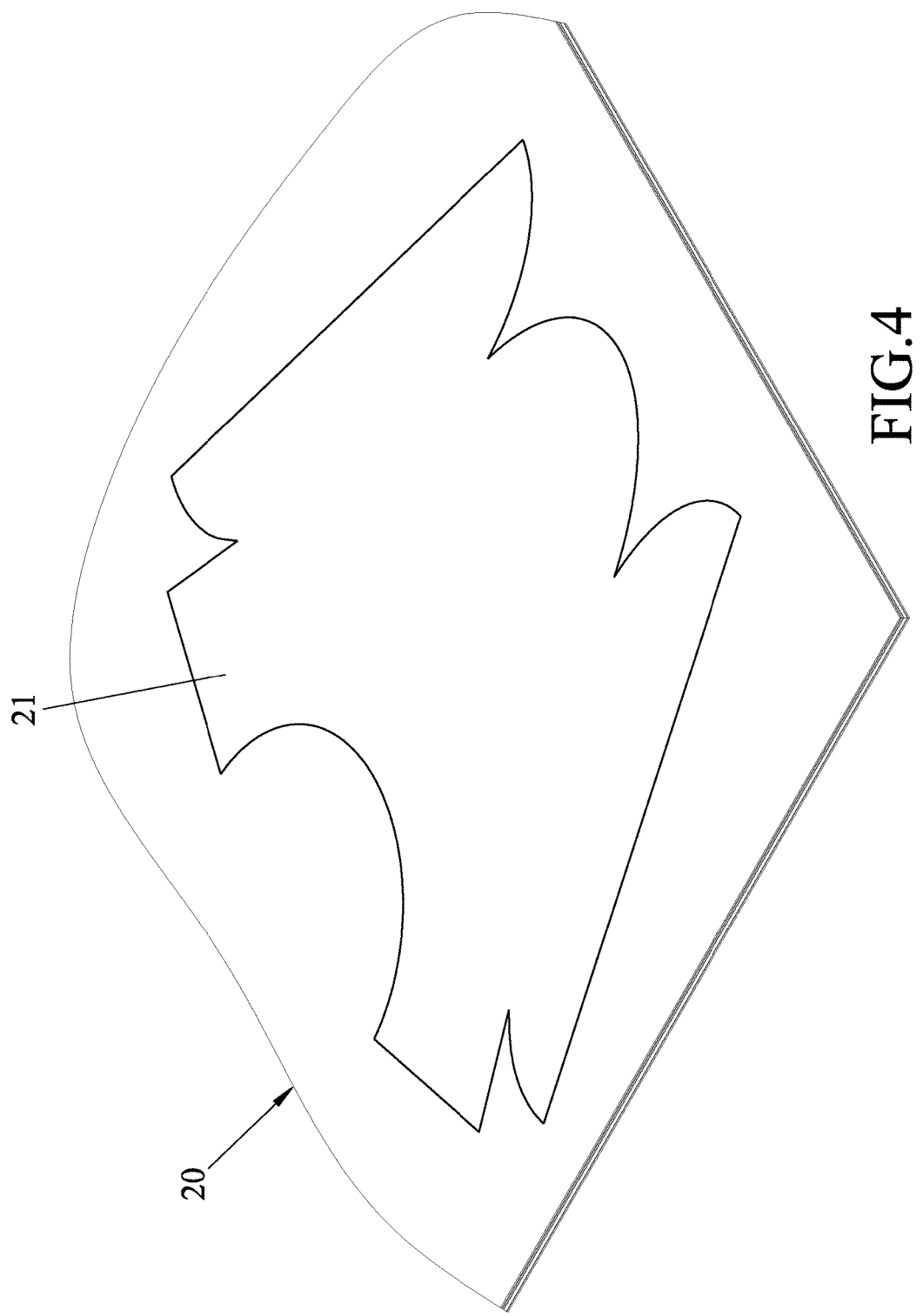
FIG. 4 is a fragmentary perspective view of the substrate.
Figure 5:
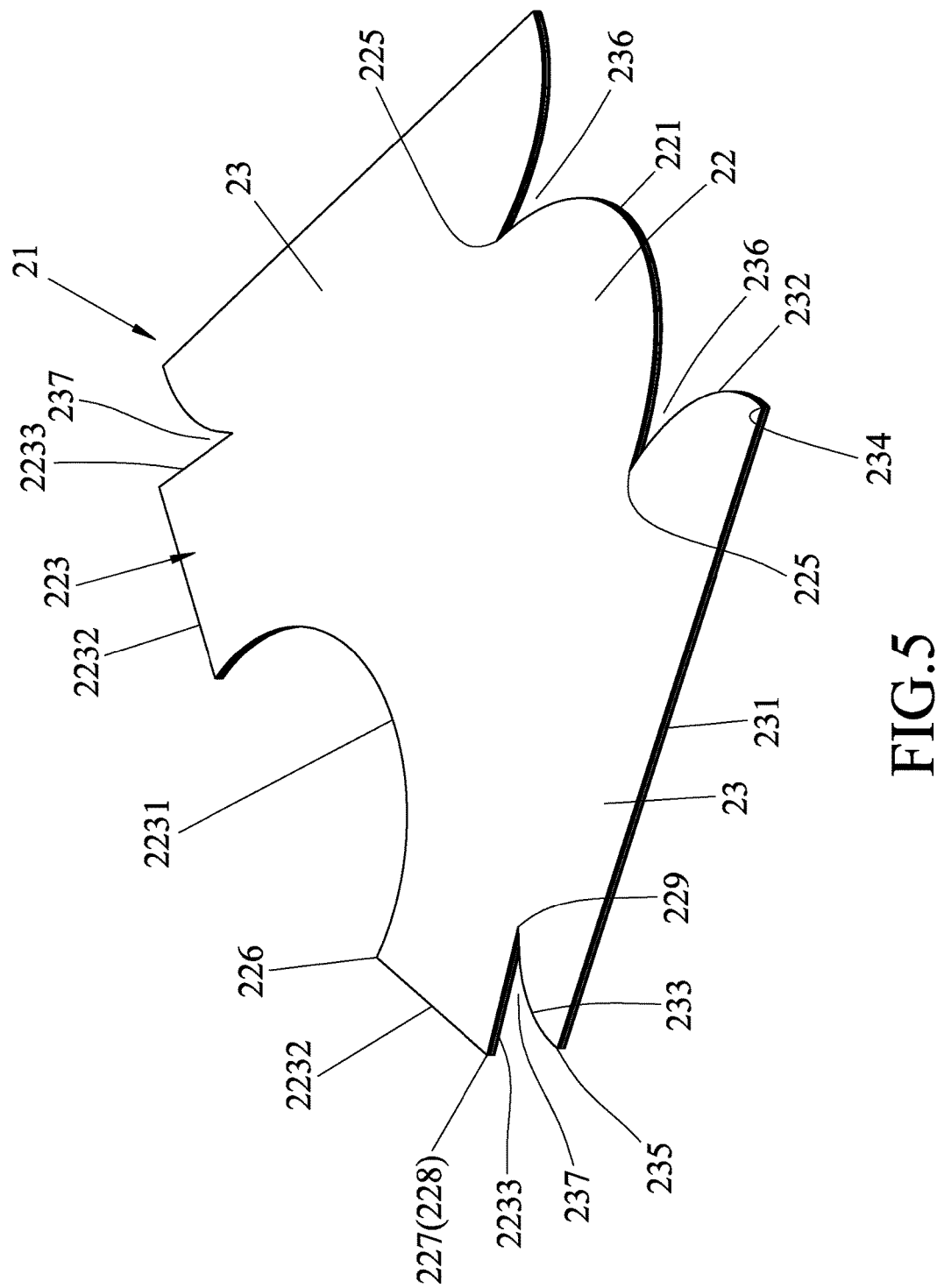
FIG. 5 is a perspective view of a cut piece cut from the substrate.

In step 220, with reference to FIGS. 4 and 5, the substrate 20 is cut to form a cut piece 21. The cut piece 21 has a main body 22, and two wing portions 23 symmetrically disposed on two opposite sides of the main body 22 and integrally connected as one piece with the main body 22. The main body 22 has a curved front convex portion 221 and a curved rear concave portion 223 opposite to the front convex portion 221. The front convex portion 221 has two circumferentially spaced-apart ends 225. The rear concave portion 223 has an inwardly curved edge 2231, two symmetrical rear mating edges 2232 extending outwardly and oppositely from two opposite ends 226 of the inwardly curved edge 2231, and two symmetrical lateral connecting edges 2233 each of which extends inwardly and transversely from one end 227 of a respective one of the rear mating edges 2232 that is opposite to the inwardly curved edge 2231. That is, each lateral connecting edge 2233 has an outer end 228 connected to the one end 227 of the rear mating edge 2232 that is opposite to the inwardly curved edge 2231, and an inner end 229 opposite to the outer end 228.

Each wing portion 23 includes a wing lateral edge 231 spaced apart from the main body 22 and having a front end 234 and a rear end 235, a front curved edge 232 between the front end 234 of the wing lateral edge 231 and a corresponding one of the ends 225 of the front convex portion 221, and a rear curved edge 233 between the rear end 235 of the wing lateral edge 231 and the inner end 229 of a respective one of the lateral connecting edges 2233. The front curved edge 232 cooperates with the front convex portion 221 to define a front space 236 therebetween. The rear curved edge 233 cooperates with the respective lateral connecting edge 2233 to define a rear space 237 therebetween.

In this embodiment, the front curved edge 232 of each wing portion 23 has an arc length substantially equal to one half of the arc length of the front convex portion 221, and the rear curved edge 233 of each wing portion 23 has a arc length substantially equal to the length of the respective lateral connecting edge 2233.

Figure 6:
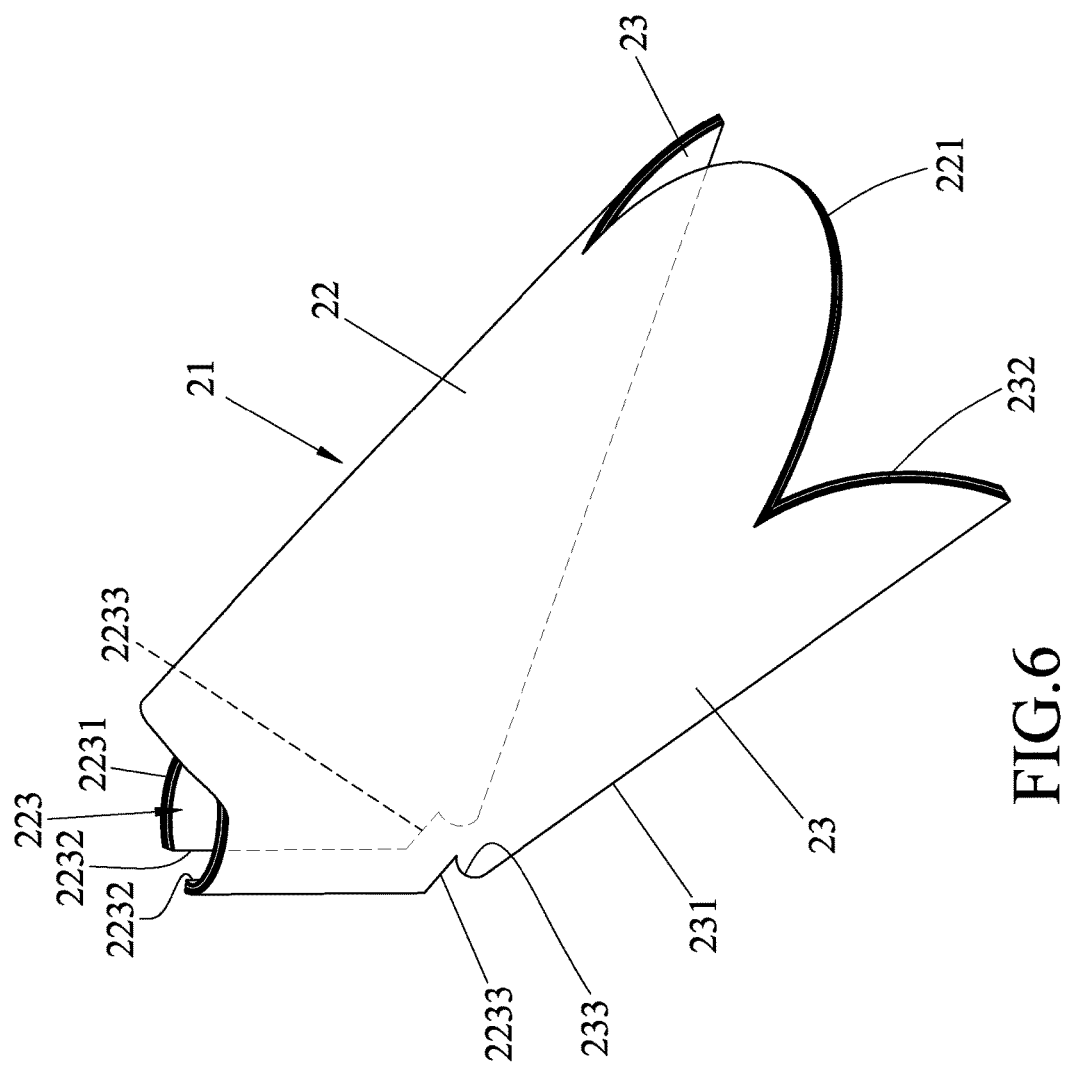
FIG. 6 illustrates the cut piece being folded.
Figure 7:
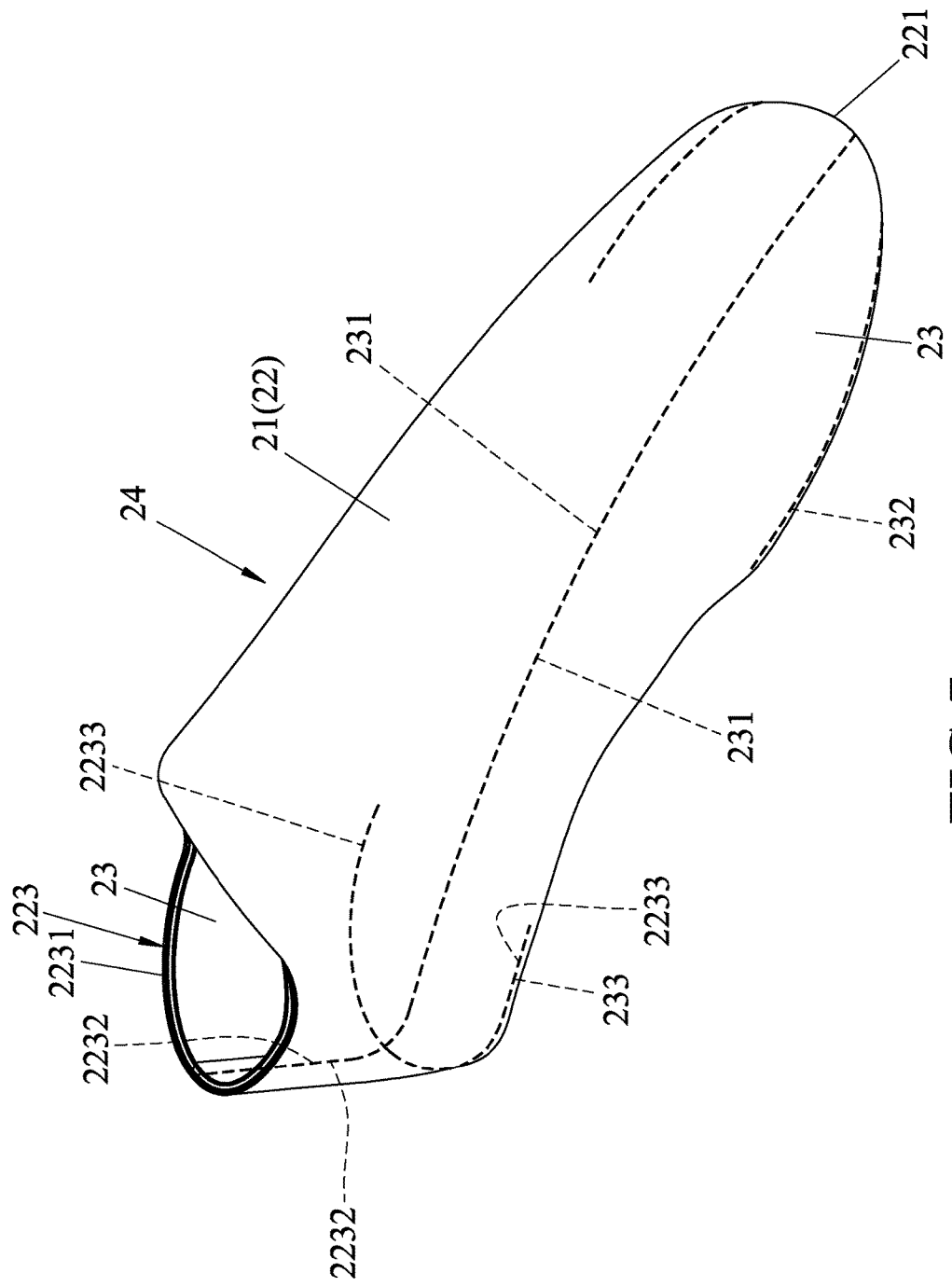
FIG. 7 illustrates how different parts of the cut piece are interconnected by ultrasonic welding.

In step 230, with reference to FIGS. 6 and 7, the rear mating edges 2232 of the main body 22 are ultrasonically welded to each other, the wing lateral edges 231 of the wing portions 23 are ultrasonically welded to each other, the front curved edge 232 of each wing portion 23 is ultrasonically welded to a periphery of the front convex portion 221 of the main body 22, and the rear curved edge 233 of each wing portion 23 is ultrasonically welded to the respective lateral connecting edge 2233 of the main body 22 so as to form the cut piece 21 into a shoe-like inner sleeve 24.

Figure 12:
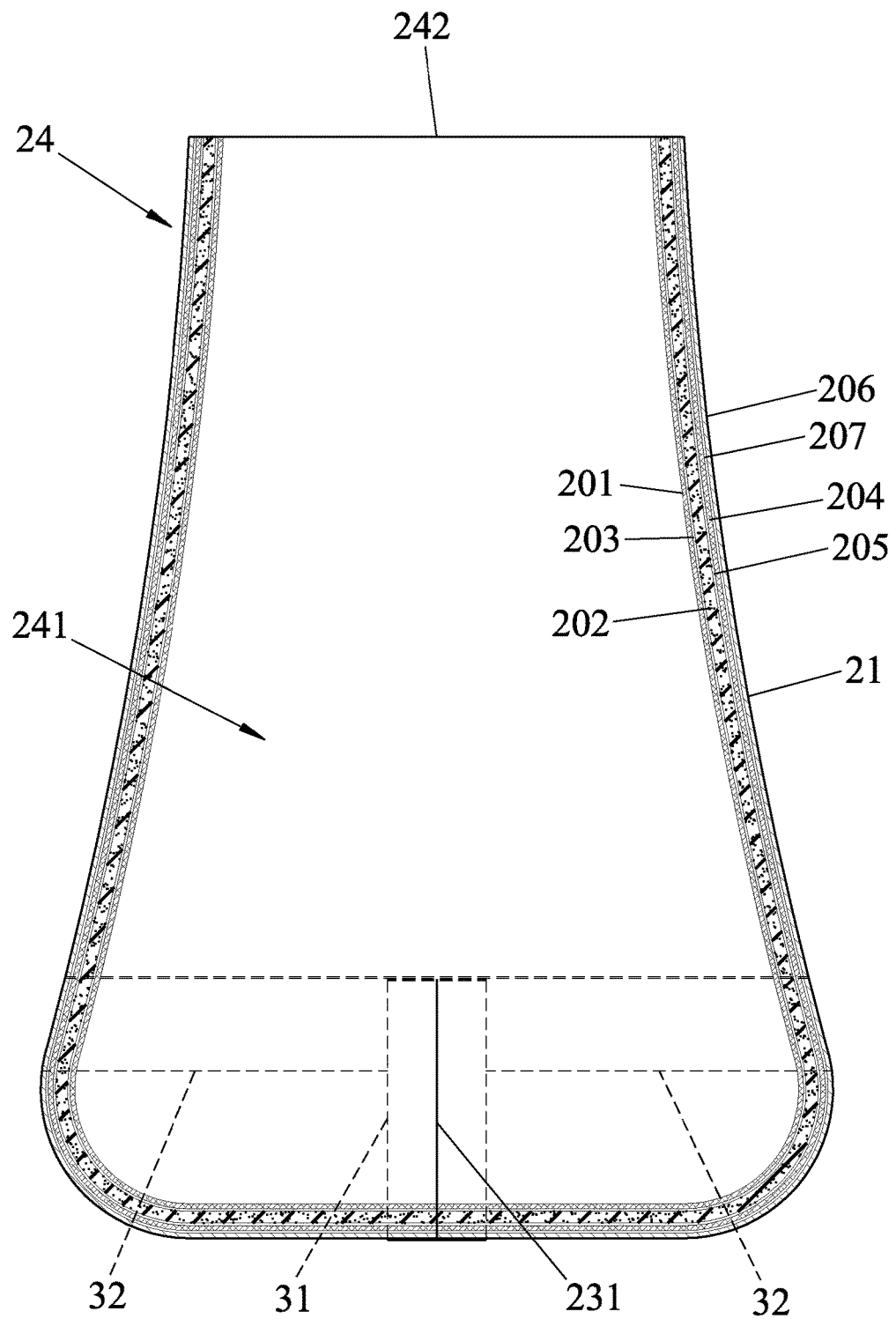
FIG. 12 is a sectional view taken along line XII-XII of FIG. 8.

In this embodiment, the shoe-like inner sleeve 24 defines a wearing space 241 having a top open end 242 and a closed bottom end. The top open end 242 of the wearing space 241 is defined by the inwardly curved edge 2231 of the rear concave portion 223 after the rear mating edges 2232 are welded to each other. A junction of the front curved edge 232 of each wing portion 23 and the periphery of the front convex portion 221 is located on a front end of the shoe-like inner sleeve 24. A junction of the rear mating edges 2232 is located on a rear end of the shoe-like inner sleeve 24. A junction of the rear curved edge 233 of each wing portion 23 and the respective lateral connecting edge 2233 is also located on the rear end of the shoe-like inner sleeve 24. A junction of the wing lateral edges 231 of the wing portions 23 is located on a bottom end of the shoe-like inner sleeve 24, and is further connected to the junction of the rear mating edges 2232. As shown in FIG. 12, an inner surface of the shoe-like inner sleeve 24 corresponding to an instep of the user will not have any joining marks, and presents a smooth surface.

Figure 8:
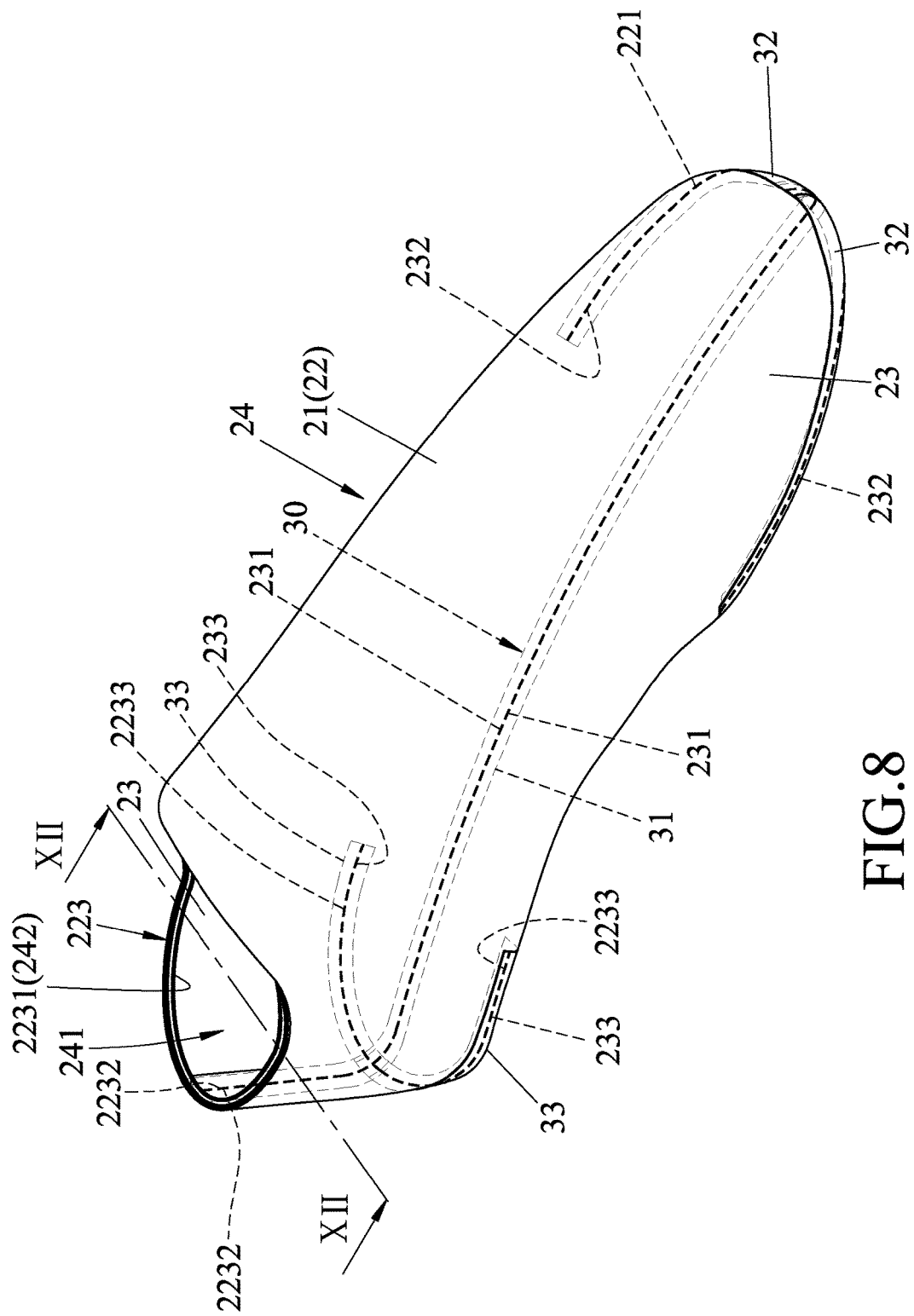
FIG. 8 is a view similar to FIG. 7, but illustrating the waterproof unit being covered on welded parts of the cut piece to form a shoe-like inner sleeve.
Figure 9:
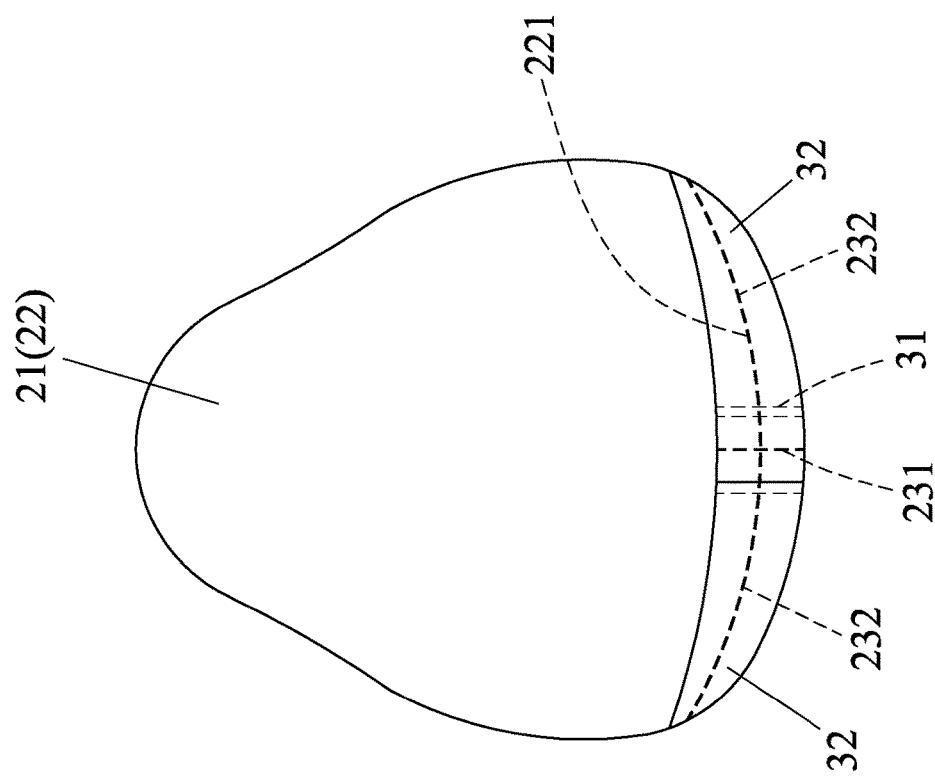
FIG. 9 is a right side view of FIG. 8.
Figure 10:
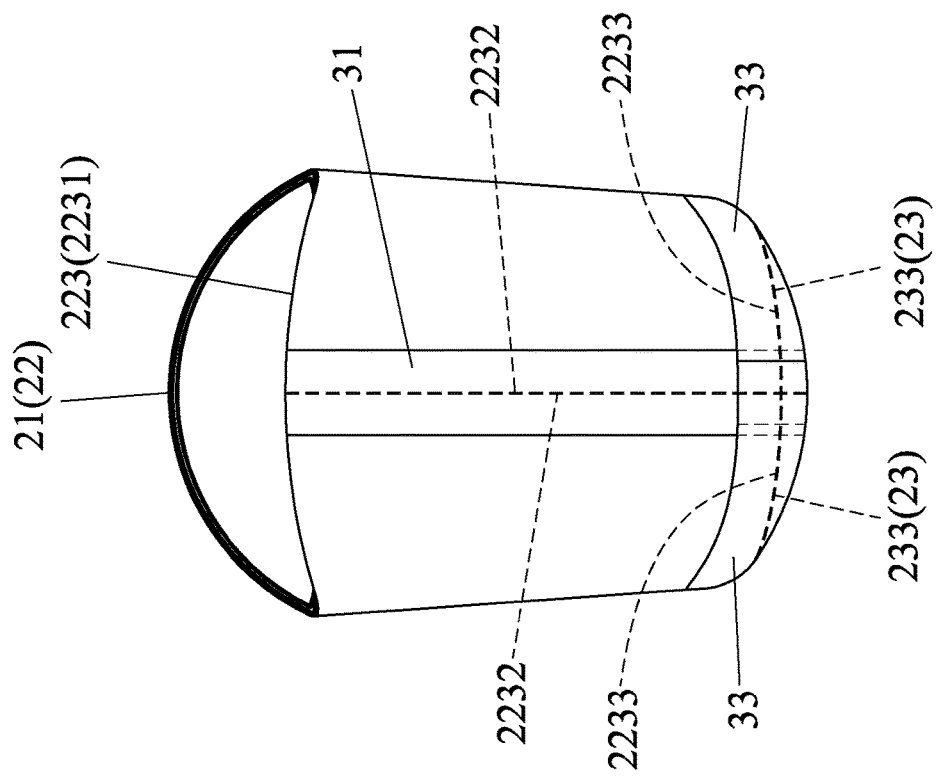
FIG. 10 is a left side view of FIG. 8.
Figure 11:
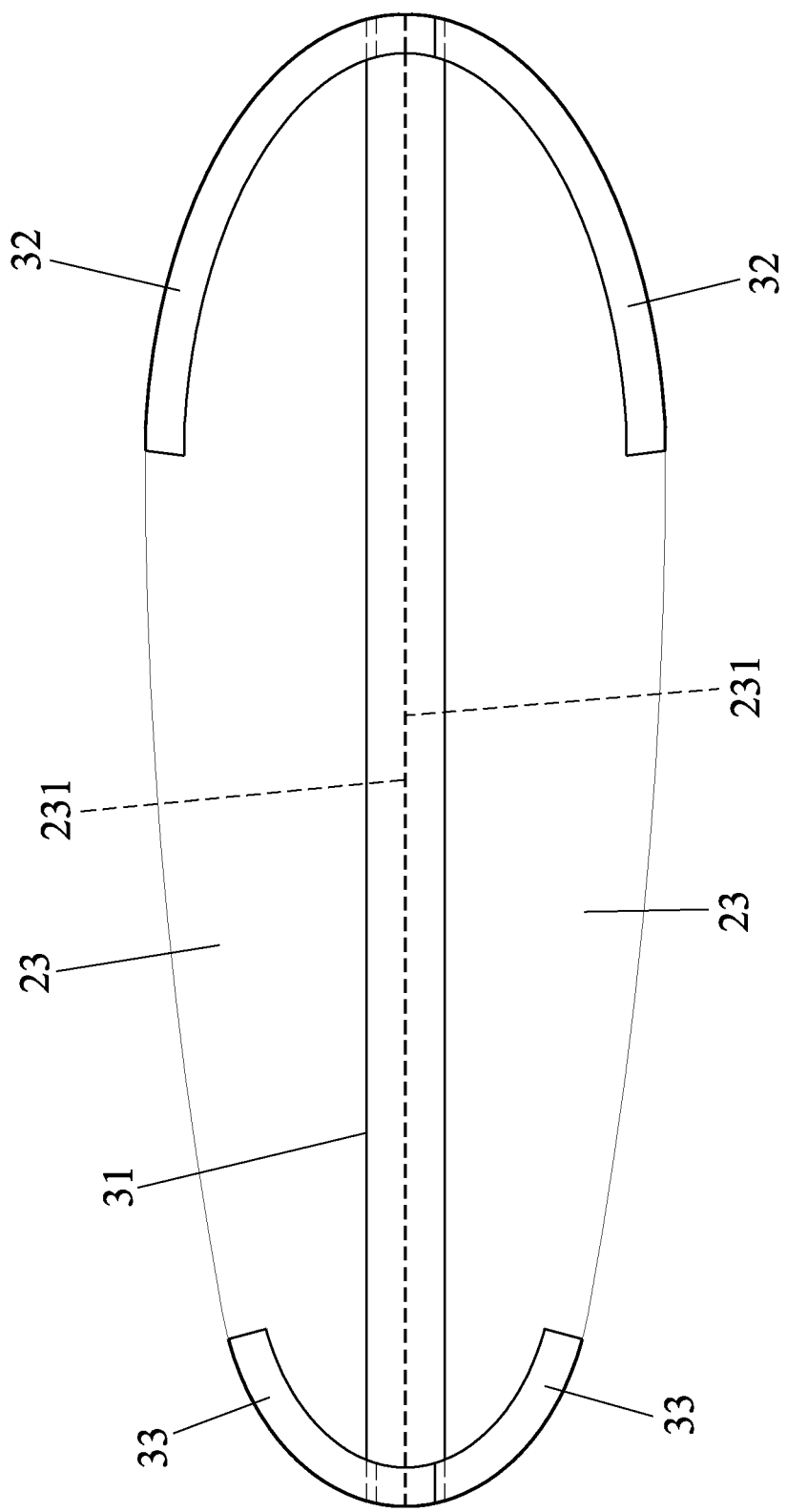
FIG. 11 is a bottom view of FIG. 8.

In step 240, the main waterproof strip 31 and the first and second auxiliary waterproof strips 32, 33 of the waterproof unit 30 are fixedly connected to an outer surface of the shoe-like inner sleeve 24. With reference to FIGS. 2, 8 and 11, the main waterproof strip 31 is fixedly connected to the outer surface of the shoe-like inner sleeve 24 at a position corresponding to the junction of the rear mating edges 2232 and the junction of the wing lateral edges 231 so as to cover the same. The main waterproof strip 31 extends from a rear end to a front end of the shoe-like inner sleeve 24. Each first auxiliary waterproof strip 32 is fixedly connected to the outer surface of the shoe-like inner sleeve 24 at a position corresponding to the junction of the front curved edge 232 of each wing portion 23 and the periphery of the front convex portion 221 so as to cover the same, as shown in FIG. 9. The first auxiliary waterproof strips 32 interlace with a front end of the main waterproof strip 31. Each second auxiliary waterproof strip 33 is fixedly connected to the outer surface of the shoe-like inner sleeve 24 at a position corresponding to the junction of each rear curved edge 233 and the respective lateral connecting edge 2233 so as to cover the same, as shown in FIG. 10. The second auxiliary waterproof strips 33 interlace with a rear end of the main waterproof strip 31.

It should be noted herein that the main waterproof strip 31 and the first and second auxiliary waterproof strips 32, 33 can enhance the waterproof effect of the entire shoe-like inner sleeve 24.

Figure 13:
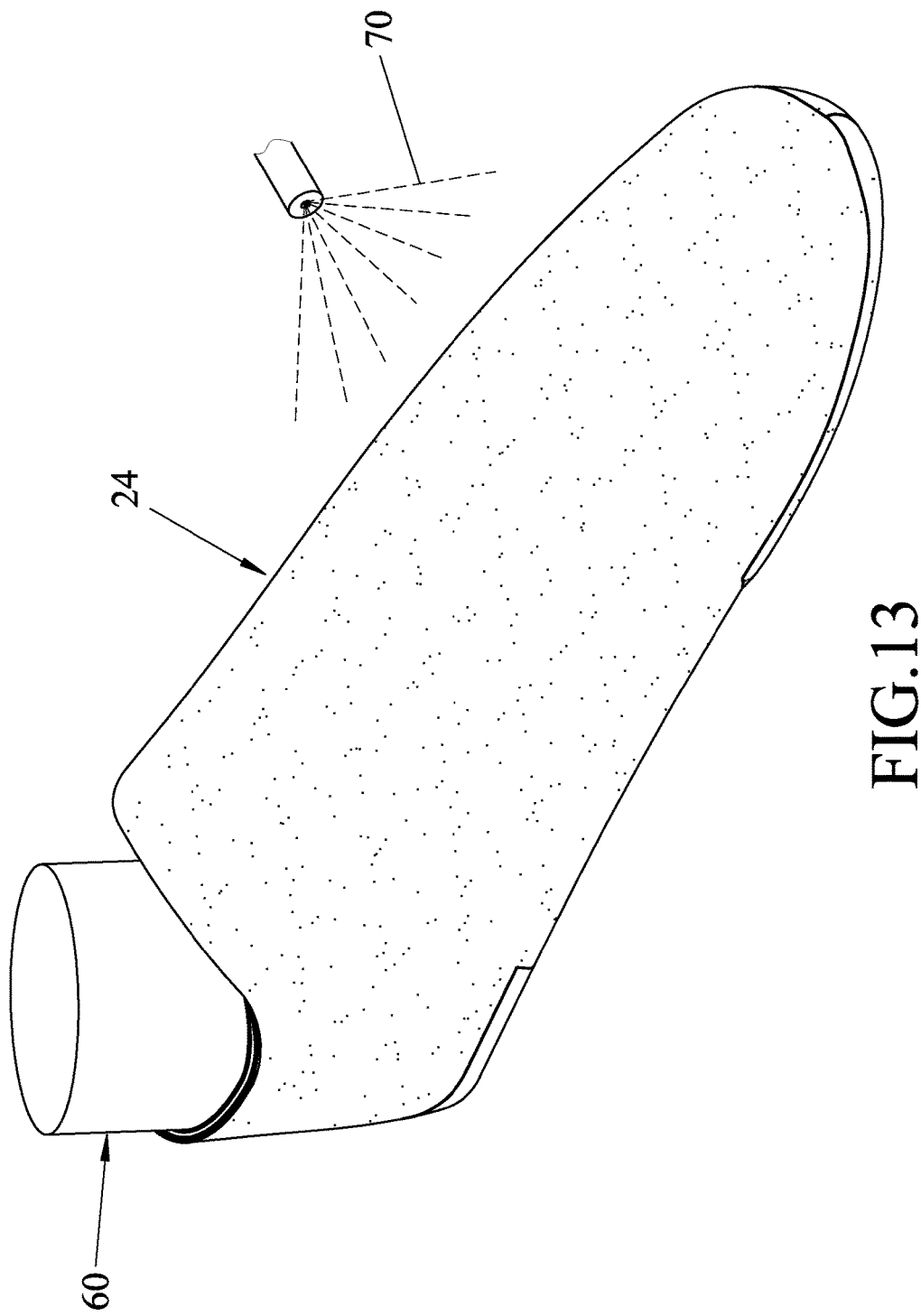
FIG. 13 illustrates the shoe-like inner sleeve being sleeved on the shoe last and an outer surface thereof being coated with an adhesive.

In step 250, with reference to FIG. 13, the shoe-like inner sleeve 24 is sleeved on the shoe last 60 such that the shoe last 60 is inserted into the wearing space 241 (see FIGS. 8 and 12) of the shoe-like inner sleeve 24, and the outer surface of the shoe-like inner sleeve 24 is coated with an adhesive 70 and dried. In this embodiment, the adhesive 70 is sprayed on the outer surface of the shoe-like inner sleeve 24.

Figure 14:
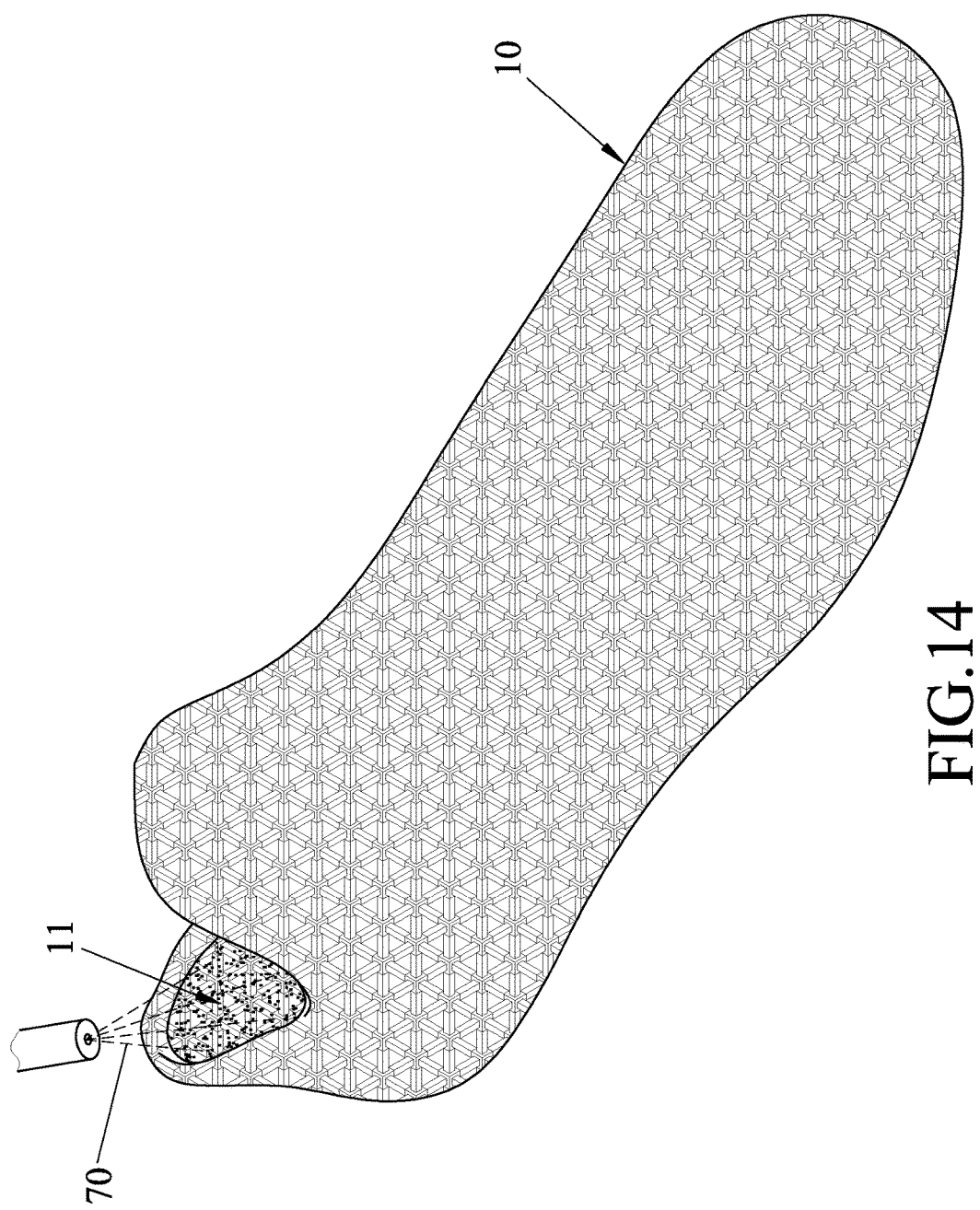
FIG. 14 illustrates an inner surface of the upper being coated with an adhesive.
Figure 15:
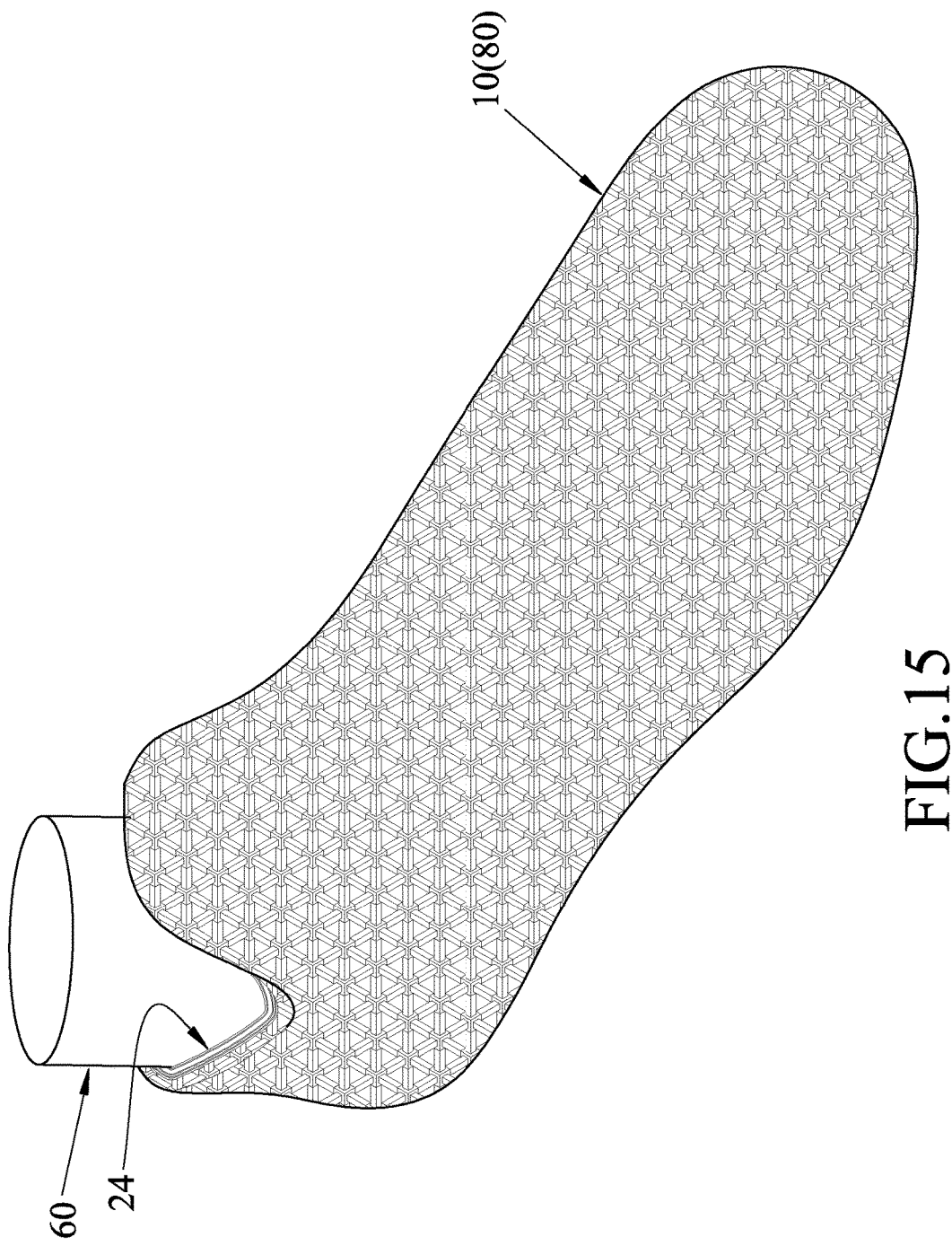
FIG. 15 illustrates the upper being sleeved on the shoe last with the shoe-like inner sleeve, and the assembly of the upper, the shoe last and the shoe-like inner sleeve being heated to form a moisture-permeable waterproof foot cover.

In step 260, with reference to FIG. 14, an inner surface of the upper 10 is coated with the adhesive 70 and dried. In this embodiment, the adhesive 70 is sprayed on the inner surface of the upper 10.

In step 270, with reference to 15, the upper 10 is sleeved on the shoe last 60 with the shoe-like inner sleeve 24 such that the shoe last 60 along with the shoe-like inner sleeve 24 is inserted into the receiving space 11 (see FIGS. 2 and 14) of the upper 10, after which the assembly of the shoe last 60, the shoe-like inner sleeve 24 and the upper 10 is heated to a predetermined temperature so as to adhere together the shoe-like inner sleeve 24 and the upper 10 and form a moisture-permeable waterproof foot cover 80. In this embodiment, the assembly of the shoe last 60, the shoe-like inner sleeve 24 and the upper 10 is placed in an oven (not shown) and heated. The predetermined temperature is between 100° C. and 180° C. As such, as shown in FIGS. 17 and 18, the adhesive 70 between the upper 10 and the shoe-like inner sleeve 24 is solidified to form an adhesive layer 71, so that the upper 10 and the shoe-like inner sleeve 24 are tightly adhered to each other, and the shape of the moisture-permeable waterproof foot cover 80 is set.

Figure 16:
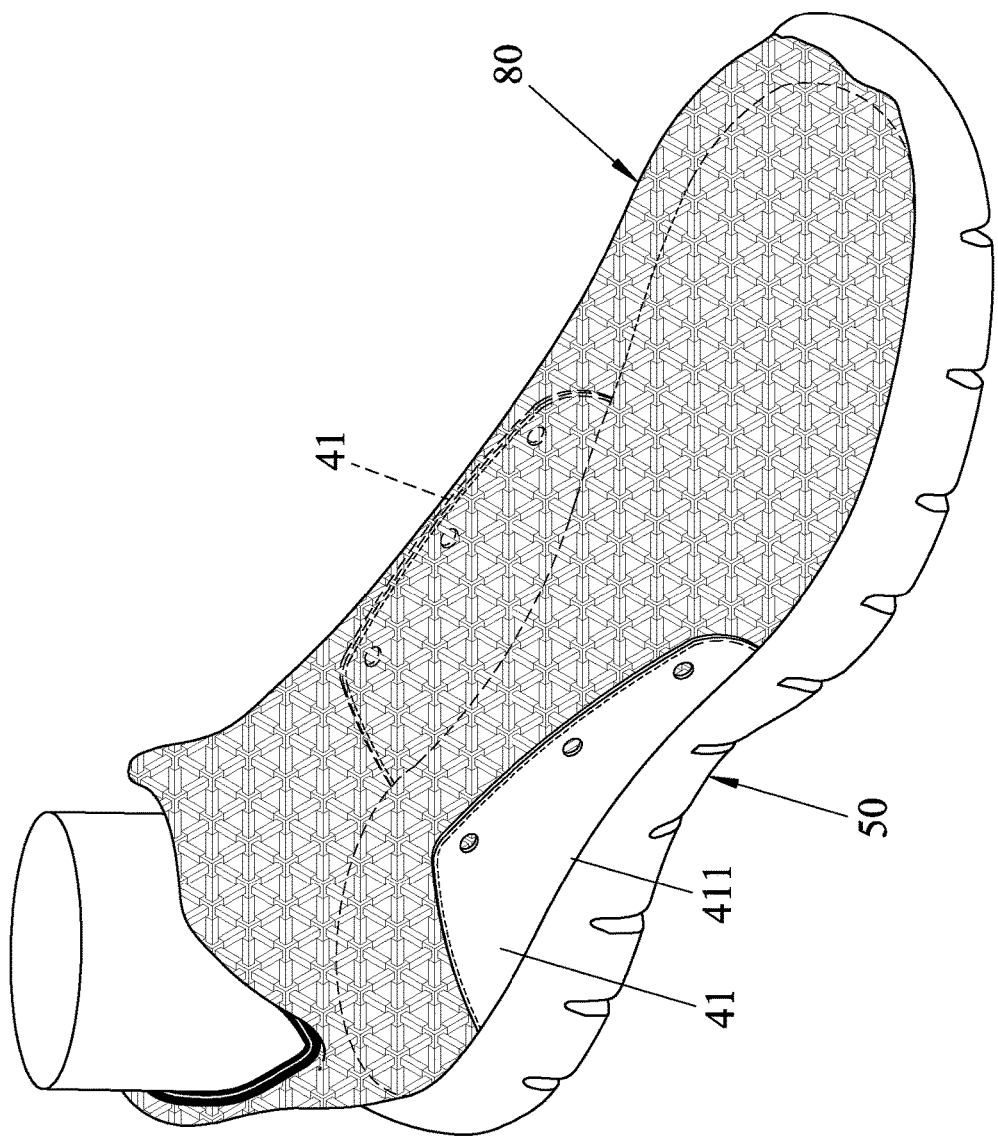
FIG. 16 is a view similar to FIG. 15, but with two tightening plates of the tightening unit being symmetrically disposed on left and right sides of the moisture-permeable waterproof foot cover, and with the sole being fixed to a bottom portion of the moisture-permeable waterproof foot cover and bottom end portions of the tightening plates.

In step 280, with reference to FIG. 16, the tightening plates 41 are symmetrically disposing on left and right sides of the moisture-permeable waterproof foot cover 80.

Figure 17:
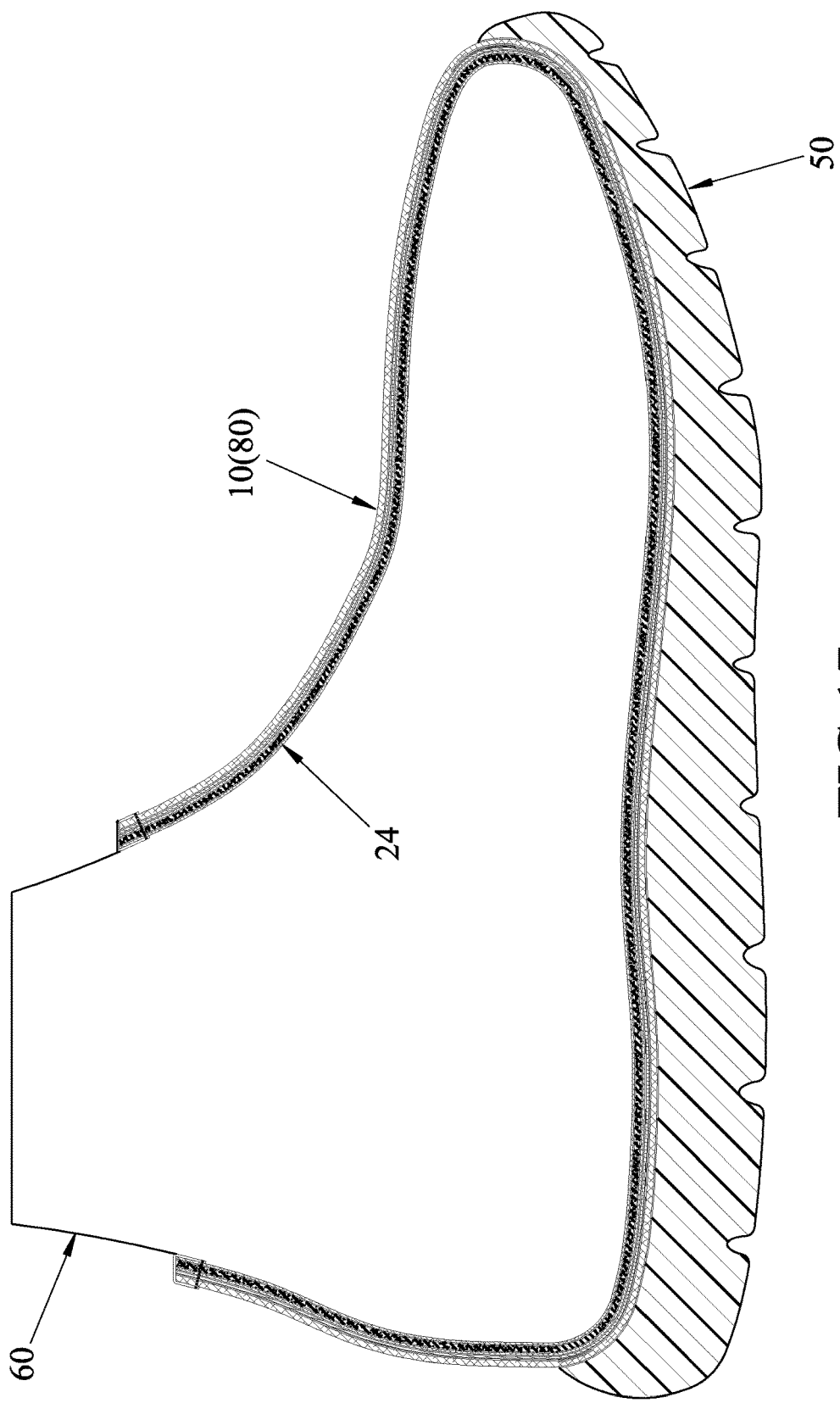
FIG. 17 is a sectional side view of FIG. 16.
Figure 18:
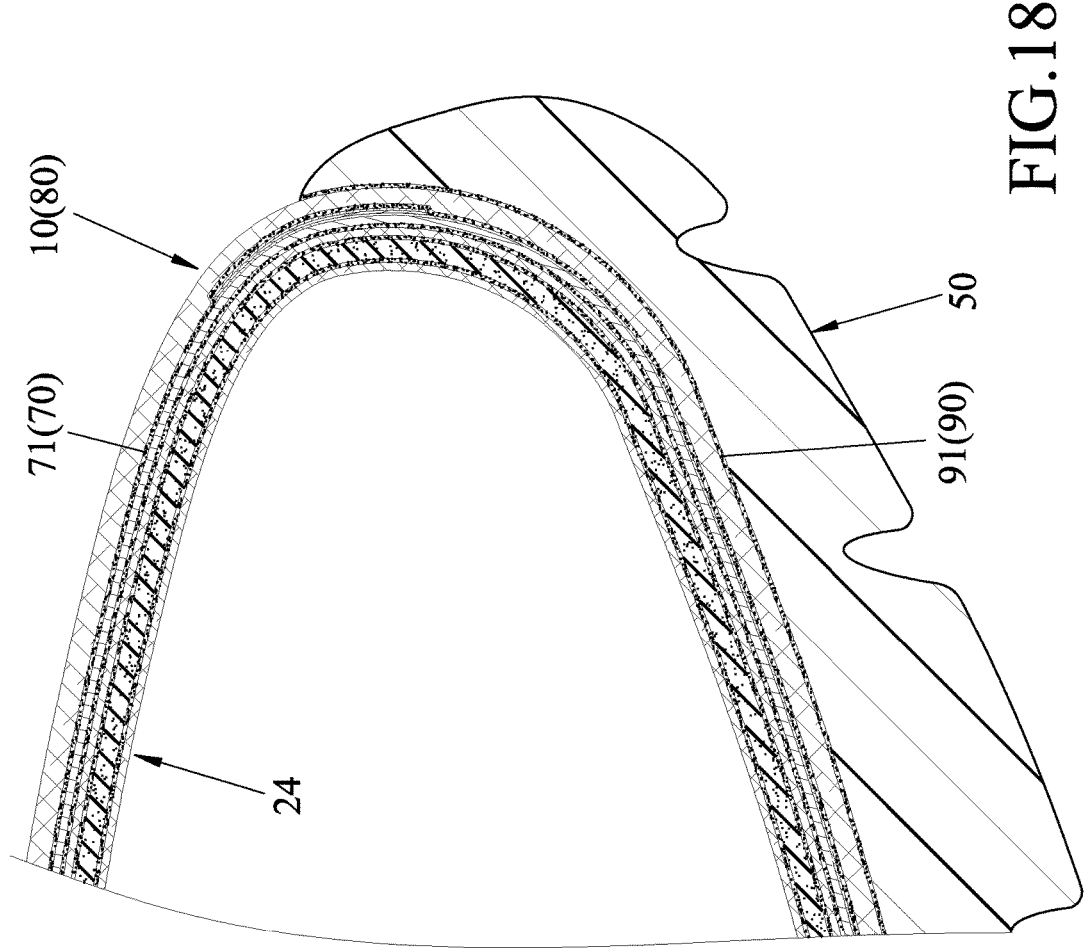
FIG. 18 is an enlarged fragmentary sectional view of FIG. 17.

In step 290, with reference to FIGS. 16 and 17, a bottom portion of the moisture-permeable waterproof foot cover 80 and the bottom end portions 411 of the tightening plates 41 are simultaneously fixed to the sole 50. In this embodiment, as shown in FIGS. 17 and 18, the bottom portion of the moisture-permeable waterproof foot cover 80 together with the bottom end portions 411 of the tightening plates 41 is fixed to a top portion of the sole 50 using an adhesive 90. The adhesive 90 is solidified to form an adhesive layer 91 between the sole 50 and the moisture-permeable waterproof foot cover 80.

Figure 19:
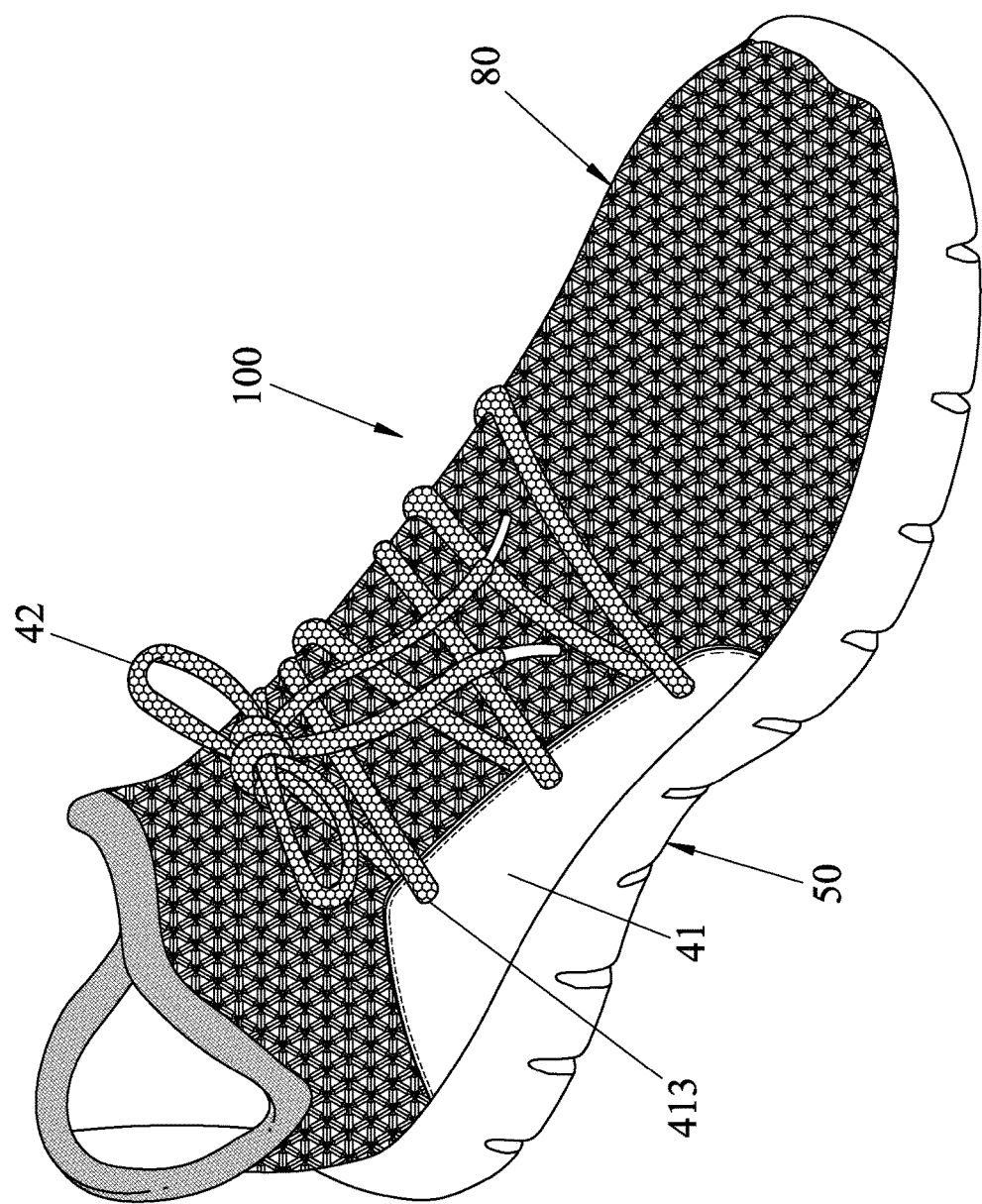
FIG. 19 is a view similar to FIG. 16, but with the shoe last being removed from the moisture-permeable waterproof foot cover and a tightening strap of the tightening unit being threaded through through holes of the tightening plates.

In step 300, with reference to FIG. 19, the shoe last 60 (see FIGS. 16 and 17) is removed from the moisture-permeable waterproof foot cover 80.

In step 310, as shown in FIG. 19, the tightening strap 42 is threaded through the through holes 413 of the tightening plates 41 in the same manner as a shoelace, thereby completing the making of the moisture-permeable waterproof shoe 100 of this embodiment.

Figure 20:
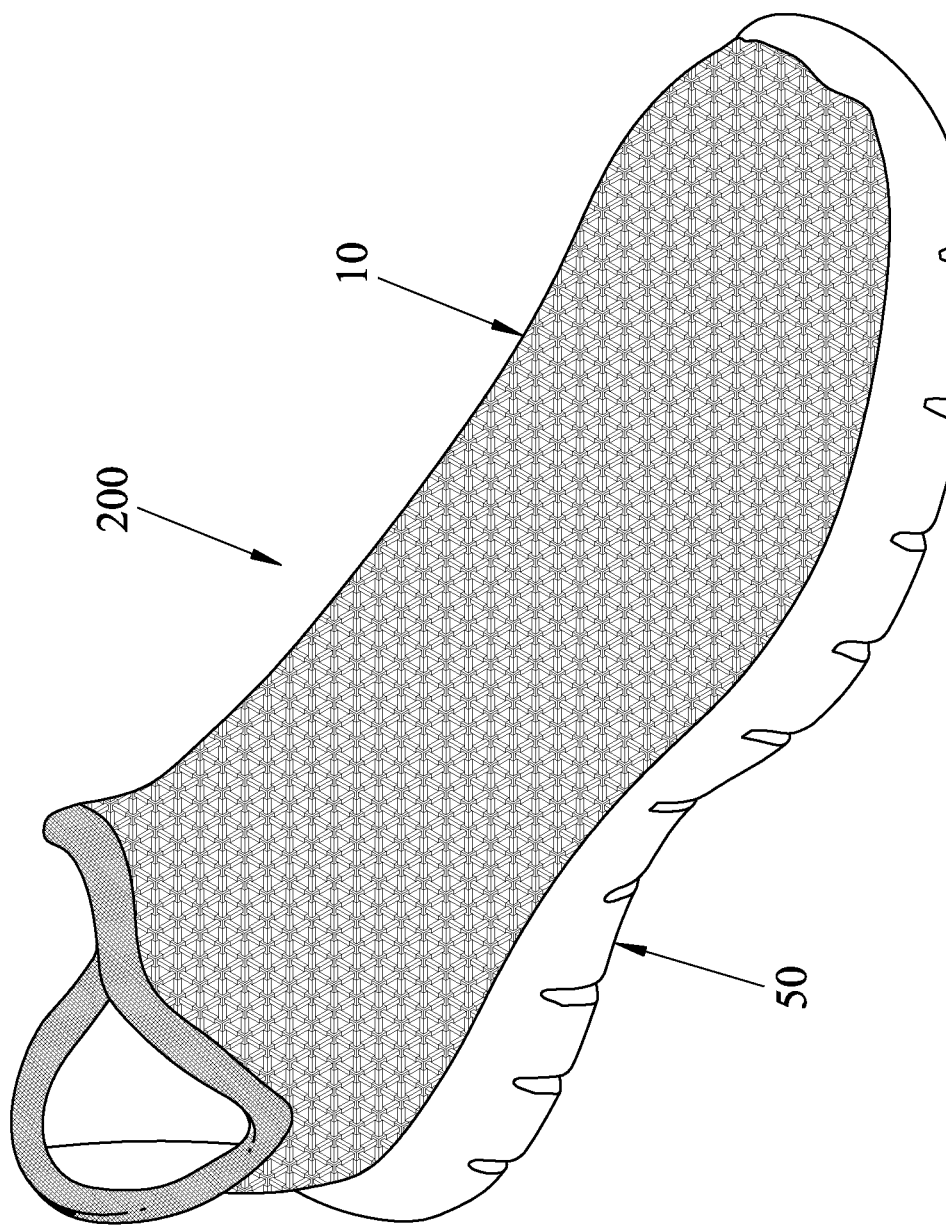
FIG. 20 is a perspective view of a modified moisture-permeable waterproof shoe made by the embodiment.

In an alternative embodiment of this disclosure, the related steps involving the disposing of the tightening unit 40 (see FIG. 19) on the upper 10 may be removed, and a modified moisture-permeable waterproof shoe 200, as shown in FIG. 20, may be obtained.

From the aforesaid description, the advantages of this disclosure can be summarized as follows:

1. The shoe-like inner sleeve 24 formed from the cut piece 21 has dual function of moisture permeability and waterproof through the moisture-permeable waterproof membrane 206. Further, the interconnection of the rear mating edges 2232 of the main body 22, the interconnection of the wing lateral edges 231 of the wing portions 23, the interconnection of the front curved edge 232 of each wing portion 23 and the periphery of the front convex portion 221 of the main body 22, and the interconnection of the rear curved edge 233 of each wing portion 23 and the respective lateral connecting edge 2233 of the main body 22 are all done by ultrasonic welding. Moreover, the junction of the rear mating edges 2232 of the main body 22, the junction of the wing lateral edges 231 of the wing portions 23, the junction of the front curved edge 232 of each wing portion 23 and the periphery of the front convex portion 221 of the main body 22, and the junction of the rear curved edge 233 of each wing portion 23 and the respective lateral connecting edge 2233 of the main body 22 are correspondingly sealed and covered by the main waterproof strip 31 and the first and second auxiliary waterproof strips 32, 33. In comparison with the prior art, the shoe-like inner sleeve 24 can effectively prevent water from entering an interior of the shoe 100, 200 to provide a good waterproof effect on the user's foot. Simultaneously, moisture can be discharged outwardly from the shoe-like inner sleeve 24 through the moisture-permeable waterproof membrane 206 so as to keep the user's foot dry. In other words, the moisture-permeable waterproof shoe 100, 200 of this disclosure has advantages of moisture permeability and waterproof in comparison with the conventional shoes having the uppers made of fabric, textile, natural leather or plastic leather, and in comparison with the conventional rubber rain boots.

2. Through the special cut structure of the cut piece 21 and in coordination with the stiffness of the foam layer 202 to support a three-dimensional shape of the shoe-like inner sleeve 24, and apart from supporting the upper 10 so that it will not collapse, insertion of the user's foot into the wearing space 241 of the shoe-like inner sleeve 24 can also be facilitated, thereby enhancing the convenient and comfort wearing of the moisture-permeable waterproof shoe 100, 200 of this disclosure.

3. Through the special cut structure of the cut piece 21, the inner surface of the shoe-like inner sleeve 24 corresponding to the instep of the user can present a smooth surface, as shown in FIG. 12, and does not have any joining marks or stitches, so that the user can feel comfortable and convenient during wear of the shoe 100, 200 of this disclosure. Even if the user does not wear socks, the instep of the user will not feel any presence of foreign body inside the shoe 100, 200.

Figure 21:
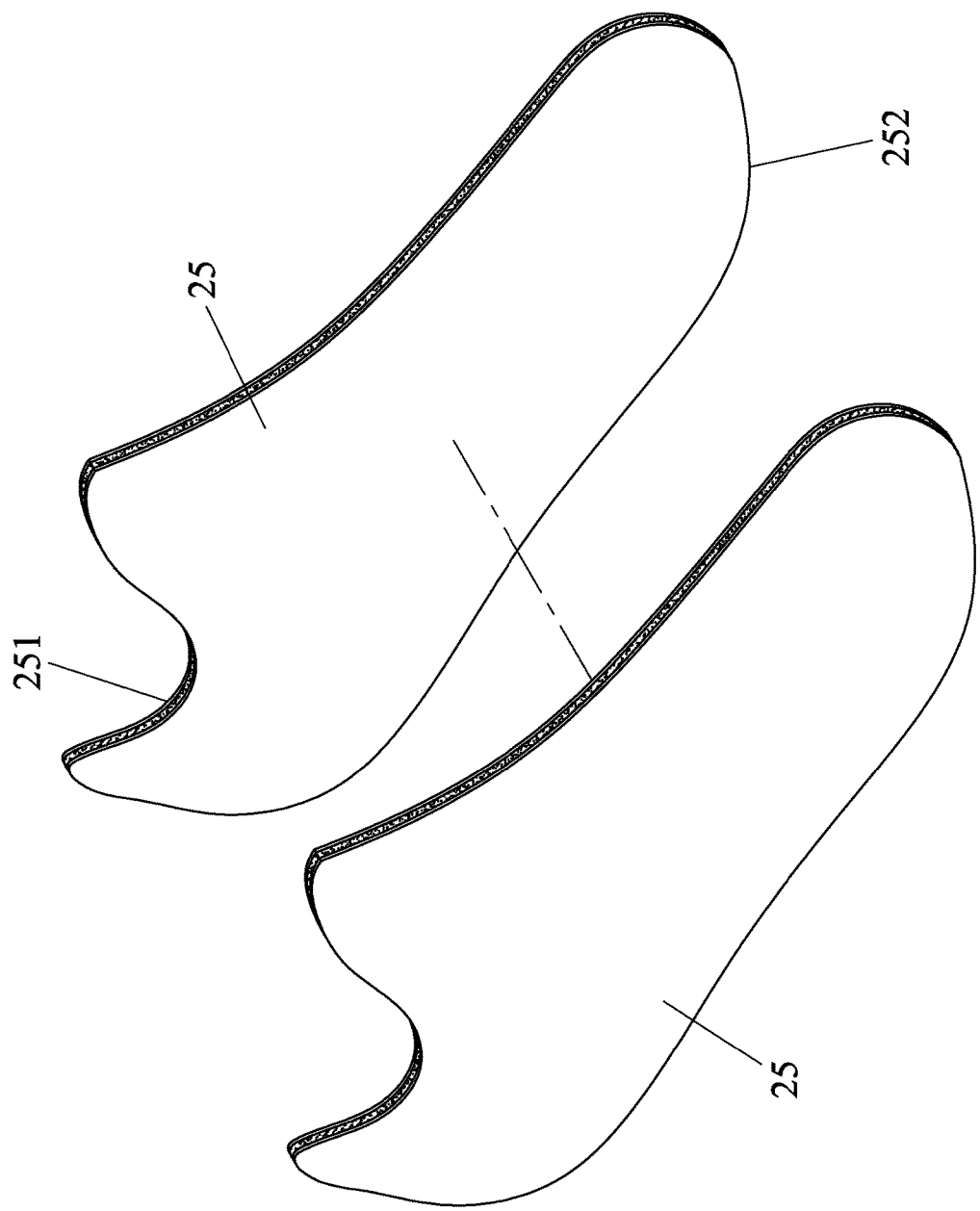
FIG. 21 illustrates the shoe-like inner sleeve of this embodiment may be made from two cut pieces.
Figure 22:
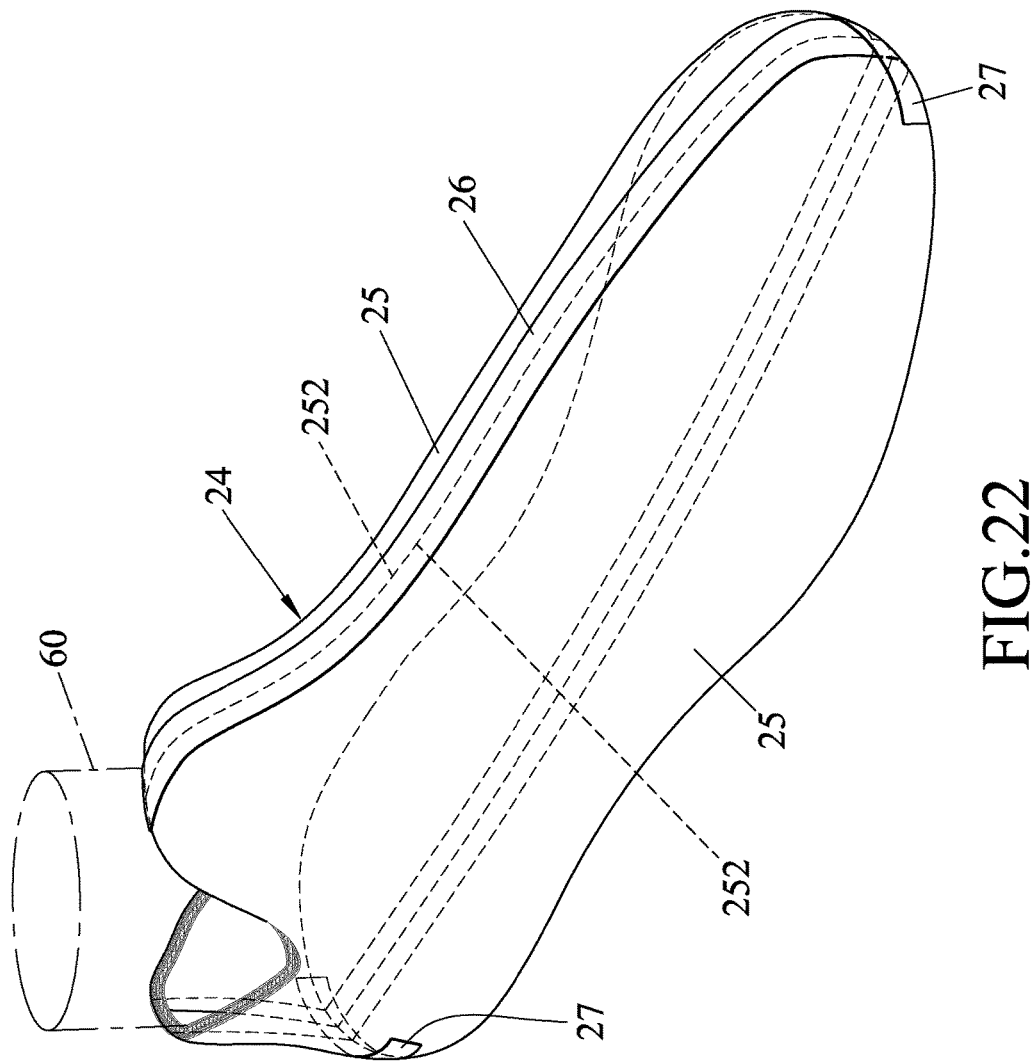
FIG. 22 illustrates the shoe-like inner sleeve made from the two cut pieces being sleeved on the shoe last.

FIGS. 21 and 22 illustrate the shoe-like inner sleeve 24 of this embodiment may be made from two interconnected cut pieces 25. Each cut piece 25 has a top concave portion 251 and a peripheral edge 252 connected to front and rear ends of the top concave portion 251. The peripheral edges 252 of the cut pieces 25 are ultrasonically welded to each other. A main waterproof strip 26 is fixed to the outer surface of the shoe-like inner sleeve 24 at a position corresponding to a junction of the peripheral edges 252 of the cut pieces 25 so as to cover the same. Moreover, a secondary waterproof strip 27 is fixed to a front end of the shoe-like inner sleeve 24, and overlaps with a front end of the main waterproof strip 26. Another secondary waterproof strip 27 is fixed to a rear end of the shoe-like inner sleeve 24, and overlaps with a rear end of the main waterproof strip 26. The secondary waterproof strip 27 fixed to the front end of the shoe-like inner sleeve 24 corresponds to the tips of the toes of the user's foot, while the secondary waterproof strip 27 fixed to the rear end of the shoe-like inner sleeve 24 corresponds to the heel of the user's foot. The main waterproof strip 26 and the secondary waterproof strips 27 can similarly enhance the waterproof effect of the entire shoe-like inner sleeve 24.

In sum, the method of this disclosure not only can produce a moisture-permeable waterproof shoe 100, 200 having a complete waterproof and moisture permeability effect, but also can provide comfort and convenience during wear thereof. Hence, the object of this disclosure can indeed be achieved.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method of making a moisture-permeable waterproof shoe comprising:

(A) preparing an upper, a substrate, a waterproof unit, a sole, and a shoe last, the upper defining a receiving space having a top open end, the substrate including a lining layer, a foam layer disposed on an outer surface of the lining layer, a first adhesive layer between the lining layer and the foam layer, an outer fabric layer disposed on an outer surface of the foam layer, a second adhesive layer between the outer fabric layer and the foam layer, a moisture-permeable waterproof membrane disposed on an outer surface of the outer fabric layer, and a third adhesive layer between the outer fabric layer and the moisture-permeable waterproof membrane;

(B) cutting the substrate to form a cut piece, the cut piece having a main body, and two wing portions symmetrically disposed on two opposite sides of the main body and integrally connected as one piece with the main body, the main body having a front convex portion, and a rear concave portion opposite to the front convex portion, the rear concave portion having an inwardly curved edge, two symmetrical rear mating edges extending outwardly and oppositely from two opposite ends of the inwardly curved edge, and two symmetrical lateral connecting edges each of which extends inwardly and transversely from one end of a respective one of the rear mating edges that is opposite to the inwardly curved edge, each of the wing portions including a wing lateral edge spaced apart from the main body and having a front end and a rear end, a front curved edge between the front end of the wing lateral edge and the front convex portion, and a rear curved edge between the rear end of the wing lateral edge and a respective one of the lateral connecting edges;

(C) ultrasonically welding the rear mating edges of the rear concave portion to each other, ultrasonically welding the wing lateral edges to each other, ultrasonically welding the front curved edge of each of the wing portions to a periphery of the front convex portion of the main body, and ultrasonically welding the rear curved edge of each of the wing portions to the respective one of the lateral connecting edges of the rear concave portion so as to form the cut piece into a shoe-like inner sleeve, the shoe-like inner sleeve defining a wearing space that has a top open end and a closed bottom end, the top open end of the wearing space being defined by the inwardly concave edge of the rear concave portion after the rear mating edges are welded to each other;

(D) fixing the waterproof unit to an outer surface of the shoe-like inner sleeve so as to cover a junction of the rear mating edges of the rear concave portion, a junction of the wing lateral edges, a junction of the front curved edge of each of the wing portions and the periphery of the front convex portion of the main body, and a junction of the rear curved edge of each of the wing portions and the respective one of the lateral connecting edges of the rear concave portion;

(E) sleeving the shoe-like inner sleeve on the shoe last such that the shoe last is inserted into the wearing space of the shoe-like inner sleeve, and coating an adhesive on the outer surface of the shoe-like inner sleeve and then drying the same;

(F) coating an adhesive on an inner surface of the upper and then drying the same;

(G) sleeving the upper on the shoe last with the shoe-like inner sleeve such that the shoe last along with the shoe-like inner sleeve is inserted into the receiving space of the upper, and heating the assembly of the shoe last, the shoe-like inner sleeve and the upper to a predetermined temperature so as to adhere the shoe-like inner sleeve and the upper together and form a moisture-permeable waterproof foot cover; and (H) fixing a bottom portion of the moisture-permeable waterproof foot cover to the sole.

2. The method as claimed in claim 1, wherein a tightening unit is further prepared in step (A), the tightening unit includes two tightening plates each of which has a bottom end portion, and the method further comprises a step of disposing the tightening plates symmetrically on left and right sides of the moisture-permeable waterproof foot cover before step (H), and simultaneously fixing the bottom end portions of the tightening plates and the bottom portion of the moisture-permeable waterproof foot cover to the sole in step (H).

3. The method as claimed in claim 2, further comprising step (I) of removing the shoe last from the moisture-permeable waterproof foot cover after step (H).

4. The method as claimed in claim 3, wherein the tightening unit further includes a tightening strap, each of the tightening plates further having a top end portion formed with a plurality of spaced-apart through holes, the method further comprising step (J) of threading alternately the tightening strap through the through holes of the tightening plates.

5. The method as claimed in claim 1, wherein:
in step (A), the moisture-permeable waterproof membrane of the substrate has a water pressure resistance of not less than 3000 mm $H_2O$ using the standard test method of the Japanese regulation JIS L1092B, and a moisture permeability of not less than 3000 $g/m^2/24$ hr using the standard test method of the Japanese regulation JIS L1099B1;
in step (B), the front curved edge of each of the wing portions has an arc length substantially equal to one half of the arc length of the front convex portion of the main body, and the rear curved edge of each of the wing portions has an arc length substantially equal to the length of the respective one of the lateral connecting edges of the rear concave portion; and
in step (C), the junction of the front curved edge of each of the wing portions and the periphery of the front convex portion of the main body is located on a front end of the shoe-like inner sleeve, the junction of the rear mating edges of the rear concave portion is located on a rear end of the shoe-like inner sleeve, the junction of the rear curved edge of each of the wing portions and the respective one of the lateral connecting edges of the rear concave portion is also located on the rear end of the shoe-like inner sleeve, and the junction of the wing lateral edges is located on a bottom end of the shoe-like inner sleeve and is further connected to the junction of the rear mating edges of the rear concave portion.

6. The method as claimed in claim 1, wherein:
in step (A), the waterproof unit has a main waterproof strip, two first auxiliary waterproof strips and two second auxiliary waterproof strips; and
in step (D), the main waterproof strip is fixedly connected to the outer surface of the shoe-like inner sleeve at a position corresponding to the junction of the rear mating edges of the rear concave portion and the junction of the wing lateral edges so as to cover the same, and extends from a rear end to a front end of the shoe-like inner sleeve, each of the first auxiliary waterproof strips being fixedly connected to the outer surface of the shoe-like inner sleeve at a position corresponding to the junction of the front curved edge of each of the wing portions and the periphery of the front convex portion of the main body so as to cover the same, each of the first auxiliary waterproof strips interlacing with a front end of the main waterproof strip, each of the second auxiliary waterproof strips being fixedly connected to the outer surface of the shoe-like inner sleeve at a position corresponding to the junction of the rear curved edge of each of the wing portions and the respective one of the lateral connecting edges of the rear concave portion so as to cover the same, each of the second auxiliary waterproof strips interlacing with a rear end of the main waterproof strip.

7. The method as claimed in claim 1, wherein the adhesive in step (E) is sprayed on the outer surface of the shoe-like inner sleeve, and the adhesive in step (F) is sprayed on the inner surface of the upper.

8. The method as claimed in claim 1, wherein the predetermined temperature in step (G) is between 100° and 180° C.

9. The method as claimed in claim 1, wherein in step (H), a top portion of the sole is fixed to the bottom portion of the moisture-permeable waterproof foot cover using an adhesive.

10. The method as claimed in claim 1, wherein in step (A), the moisture-permeable waterproof membrane is made of a material selected from the group consisting of polyurethane (PU), thermoplastic polyurethane (TPU), polyethylene (PE), polytetrafluoroethylene (PTFE), polypropylene (PP), and thermoplastic polyester elastomer (TPEE).

11. The method as claimed in claim 1, wherein in step (B):
the front convex portion of the main body has two circumferentially spaced-apart ends, the front curved edge of each of the wing portions being disposed between one of the ends of the front convex portion and the front end of the wing lateral edge of a corresponding one of the wing portions, the front curved edge of each of the wing portions cooperating with the front convex portion of the main body to define a front space therebetween; and
each of the lateral connecting edges of the rear concave portion has an outer end connected to the one end of the respective one of the rear mating edges that is opposite to the inwardly curved edge, and an inner end opposite to the outer end, the rear curved edge of each of the wing portions being disposed between the rear end of the wing lateral edge and the inner end of the respective one of the lateral connecting edges, the rear curved edge of each of the wing portions cooperating with the respective one of the lateral connecting edges to define a rear space therebetween.

* * * * *